(12) United States Patent
Minami et al.

(10) Patent No.: US 11,638,998 B2
(45) Date of Patent: May 2, 2023

(54) TRANSFER SYSTEM AND TRANSFER CONTROL METHOD

(71) Applicant: Kabushiki Kaisha Yaskawa Denki, Fukuoka (JP)

(72) Inventors: Takashi Minami, Kitakyushu (JP); Yoshiki Kimura, Kitakyushu (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 813 days.

(21) Appl. No.: 16/707,182

(22) Filed: Dec. 9, 2019

(65) Prior Publication Data

US 2020/0189115 A1 Jun. 18, 2020

(30) Foreign Application Priority Data

Dec. 18, 2018 (JP) .............................. JP2018-236119

(51) Int. Cl.
*B25J 9/16* (2006.01)
*B25J 19/02* (2006.01)
*B25J 13/08* (2006.01)
*B25J 11/00* (2006.01)

(52) U.S. Cl.
CPC ........... *B25J 9/1697* (2013.01); *B25J 9/1669* (2013.01); *B25J 19/021* (2013.01); *B25J 11/0095* (2013.01); *B25J 13/088* (2013.01)

(58) Field of Classification Search
USPC ................................................ 700/245–264
See application file for complete search history.

(56) References Cited

U.S. PATENT DOCUMENTS

| | | | | |
|---|---|---|---|---|
| 5,025,926 A * | 6/1991 | Gregerson | ........ | H01L 21/67369 206/508 |
| 5,905,850 A * | 5/1999 | Kaveh | ............... | H01L 21/67259 414/217 |
| 6,111,637 A * | 8/2000 | Lee | ................... | H01L 21/68707 414/940 |
| 9,269,529 B2 * | 2/2016 | Rodnick | ............... | H01L 21/681 |
| 9,287,149 B2 * | 3/2016 | Shimamoto | ............ | B25J 9/1065 |
| 2002/0111709 A1 * | 8/2002 | DiStasio | ................ | B25J 9/1697 700/213 |
| 2009/0310137 A1 * | 12/2009 | Choi | ..................... | H01L 21/681 901/27 |
| 2013/0085595 A1 * | 4/2013 | Kiley | ................ | H01L 21/67259 700/121 |

(Continued)

FOREIGN PATENT DOCUMENTS

JP 2005-123261 A 5/2005

*Primary Examiner* — Jonathan L Sample
(74) *Attorney, Agent, or Firm* — Venjuris, P.C.

(57) ABSTRACT

A transfer system includes a hand that supports a workpiece to be transported; an arm that moves the hand; a scanning controller that moves the hand by the arm along a scanning direction that intersects sides which are provided to be fixed to the hand and not parallel with each other, such that the sides pass a known reference position in a transfer path of the workpiece; and a position detector that detects a positional deviation of the hand in a direction intersecting the scanning direction, based on a timing at which one of the side reaches the reference position and a timing at which the other side reaches the reference position RP, while the scanning controller is moving the hand.

27 Claims, 25 Drawing Sheets

(56) References Cited

U.S. PATENT DOCUMENTS

| | | | |
|---|---|---|---|
| 2013/0325179 A1* | 12/2013 | Liao | H01L 21/681 |
| | | | 700/254 |
| 2020/0055191 A1* | 2/2020 | Nahum | B25J 9/1664 |
| 2020/0056878 A1* | 2/2020 | Nahum | B25J 19/023 |
| 2020/0094407 A1* | 3/2020 | Nahum | G05B 19/402 |

* cited by examiner

TRANSFER SYSTEM AND TRANSFER CONTROL METHOD

CROSS-REFERENCE TO RELATED APPLICATIONS

This application is based on and claims priority from Japanese Patent Application No. 2018-236119, filed on Dec. 18, 2018, the disclosure of which is incorporated herein in its entirety by reference.

TECHNICAL FIELD

The present disclosure relates to a transfer system and a transfer control method.

BACKGROUND

Japanese Laid-Open Patent Publication No. 2005-123261 discloses a method of placing, instead of an actual wafer, a teaching jig having the same dimension as that of the actual wafer, in a processing apparatus or the like, detecting the position of the teaching jig with a sensor provided in an end effector of a robot, and teaching the position of the teaching jig to the robot.

SUMMARY

According to an aspect of the present disclosure, a transfer system includes: a hand configured to support a substrate to be transferred; an arm configured to move the hand; a scanning controller configured to move the hand by the arm along a scanning direction that intersects a first line and a second line which are fixed to the hand and are not parallel with each other, such that the first line and the second line pass a known reference position in a transfer path of the substrate; and a position detector configured to detect a positional deviation of the hand in a direction intersecting the scanning direction, based on a first timing at which the first line reaches the reference position and a second timing at which the second line reaches the reference position, while the scanning controller is moving the hand.

According to another aspect of the present disclosure, a transfer control method includes: providing a first line and a second line to be fixed on a hand of a transfer system supporting a substrate to be transferred, the first line and the second line being not parallel with each other, moving the hand by an arm along a scanning direction that intersects the first line and the second line such that the first line and the second line pass a known reference position in a transfer path of the substrate, and detecting a positional deviation of the hand in a direction intersecting the scanning direction, based on a first timing at which the first line reaches the reference position and a second timing at which the second line reaches the reference position, while the hand is being moved along the scanning direction.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
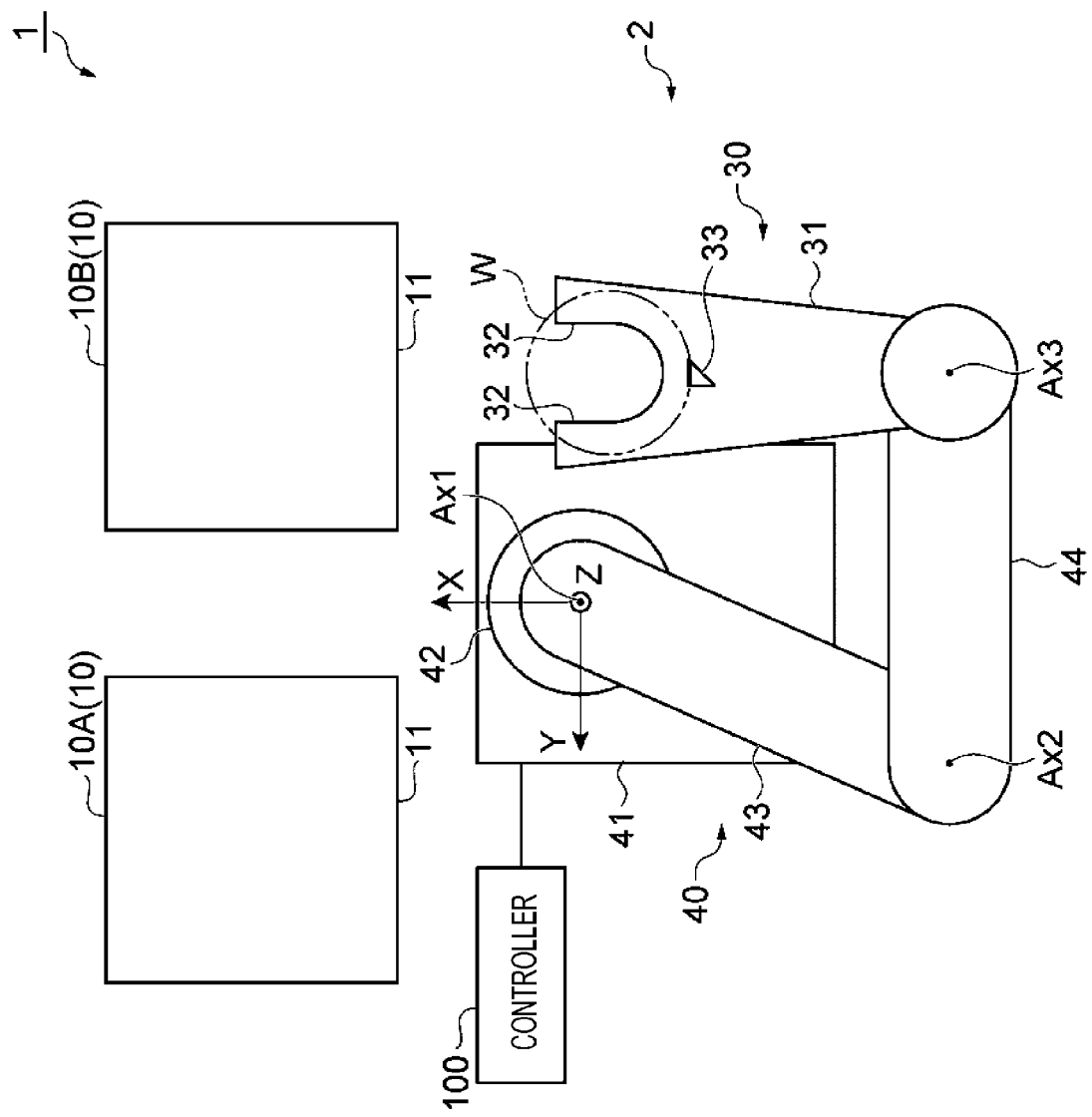
FIG. 1 is a schematic view illustrating an outline of a configuration of a substrate processing system.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Non-limiting embodiments of the present disclosure relate to providing a transfer system which is effective in performing a calibration of a position of a hand that supports a substrate, using a simple configuration with a high accuracy.

Hereinafter, embodiments will be described in detail with reference to the drawings. In the descriptions, the same components or components having the same functions will be denoted by the same reference numerals, and overlapping descriptions thereof will be omitted.

[Substrate Processing System]

A substrate processing system 1 illustrated in FIG. 1 is a system that performs, for example, a liquid processing and a thermal processing on a substrate. Specific examples of the substrate to be processed include a semiconductor wafer, an LCD substrate, and a glass substrate. Hereinafter, the substrate to be processed may be referred to as a workpiece W.

(Overall Configuration)

As illustrated in FIG. 1, the substrate processing system 1 includes a plurality of processing stations 10 and a transfer system 2. While the number of the processing stations 10 is not particularly limited, FIG. 1 illustrates only two processing stations 10 which are necessary for the descriptions herein below. Hereinafter, the two processing stations 10 will be discriminated into processing stations 10A and 10B as necessary. The processing stations 10A and 10B are arranged side by side horizontally in this embodiment.

Each processing station 10 is configured to perform a predetermined processing on the workpiece W, and includes a carry-in port 11 for carrying in/out the workpiece W to/from the processing station 10. The carry-in port 11 is provided along the vertical plane of the processing station 10. In other words, the carry-in port 11 is opened in the horizontal direction of the processing station 10. The openings of the processing stations 10A and 10B are formed in the direction orthogonal to the direction in which the processing stations 10A and 10B are arranged side by side.

The transfer system 2 is a system for carrying in/out the workpiece W to/from each processing station 10. The transfer system 2 includes a hand 30, an arm 40, and a controller 100. The hand 30 supports the workpiece W which is a transfer target. The hand 30 has a horizontal plate-shaped base 31 and two fingers 32 that protrude in one direction from the outer periphery of the base 31. The base 31 and the two fingers 32 of the hand 30 support the workpiece W. Hereinafter, in the descriptions of the hand 30, the end of the hand 30 on the side of the two fingers 32 will be referred to as the "tip end," and the end of the hand 30 on the opposite side to the two fingers 32 will be referred to as the "base end." In addition, the shape of the hand 30 is not limited to that described above, and the hand 30 may have any other shape as long as the hand 30 is able to support the workpiece W.

The arm 40 is an articulated (multi-joint) arm that moves the hand 30. For example, the arm 40 includes a base mount 41, a lifting unit 42, a first arm 43, and a second arm 44. The base mount 41 is provided at a predetermined position in the substrate processing system 1. The base mount 41 may be fixed on the floor surface of the substrate processing system 1 or may be fixed on a movable member that moves in the substrate processing system 1.

The lifting unit 42 protrudes vertically upward from the base mount 41, and is movable up and down along a vertical axis Ax1. The first arm 43 extends horizontally from the upper end of the lifting unit 42, and is able to swivel around the axis Ax1. The second arm 44 extends further horizontally from the tip end of the first arm 43, and is able to swivel around a vertical axis Ax2 that passes through the tip end of the first arm 43. The tip end of the second arm 44 is connected to the base end of the hand 30. The hand 30 is able to swivel around a vertical axis Ax3 that passes through the tip end of the second arm 44.

Figure 4:
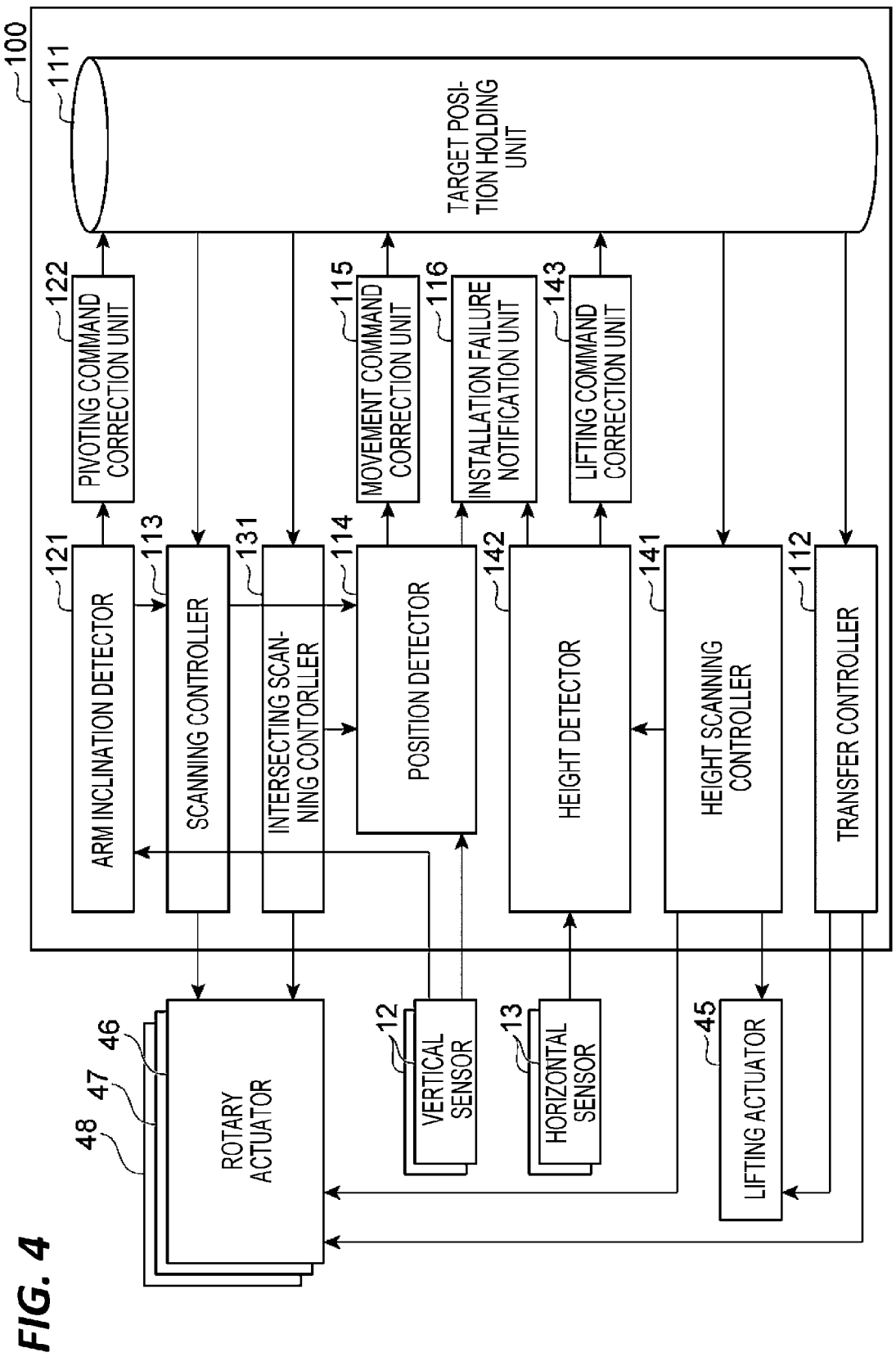
FIG. 4 is a block diagram illustrating a functional configuration of a controller.

The arm 40 includes a plurality of actuators (not illustrated) for moving the hand 30. For example, the plurality of actuators include a lifting actuator 45 that moves up and down the lifting unit 42 along the axis Ax1, a rotary actuator 46 that causes the first arm 43 to swivel around the axis Ax1, a rotary actuator 47 that causes the second arm 44 to swivel around the axis Ax2, and a rotary actuator 48 that causes the hand 30 to swivel around the axis Ax3 (see, e.g., FIG. 4). In addition, the configuration of the arm 40 is merely an example, and the arm 40 may have any other configuration as long as the position and the direction of the hand 30 in the horizontal direction and the height of the hand 30 may be freely adjusted.

The controller 100 controls the arm 40 to move the hand 30 to a target position/target posture/target height based on, for example, a robot coordinate system. The robot coordinate system is a three-dimensional orthogonal coordinate system that is fixed to, for example, the base mount 41 and set such that the direction in which the workpiece W enters the processing station 10 is the positive direction of the X axis, and the vertical upward direction is the positive direction of the Z axis. The configuration of the controller 100 will be described in detail later.

Figure 2:
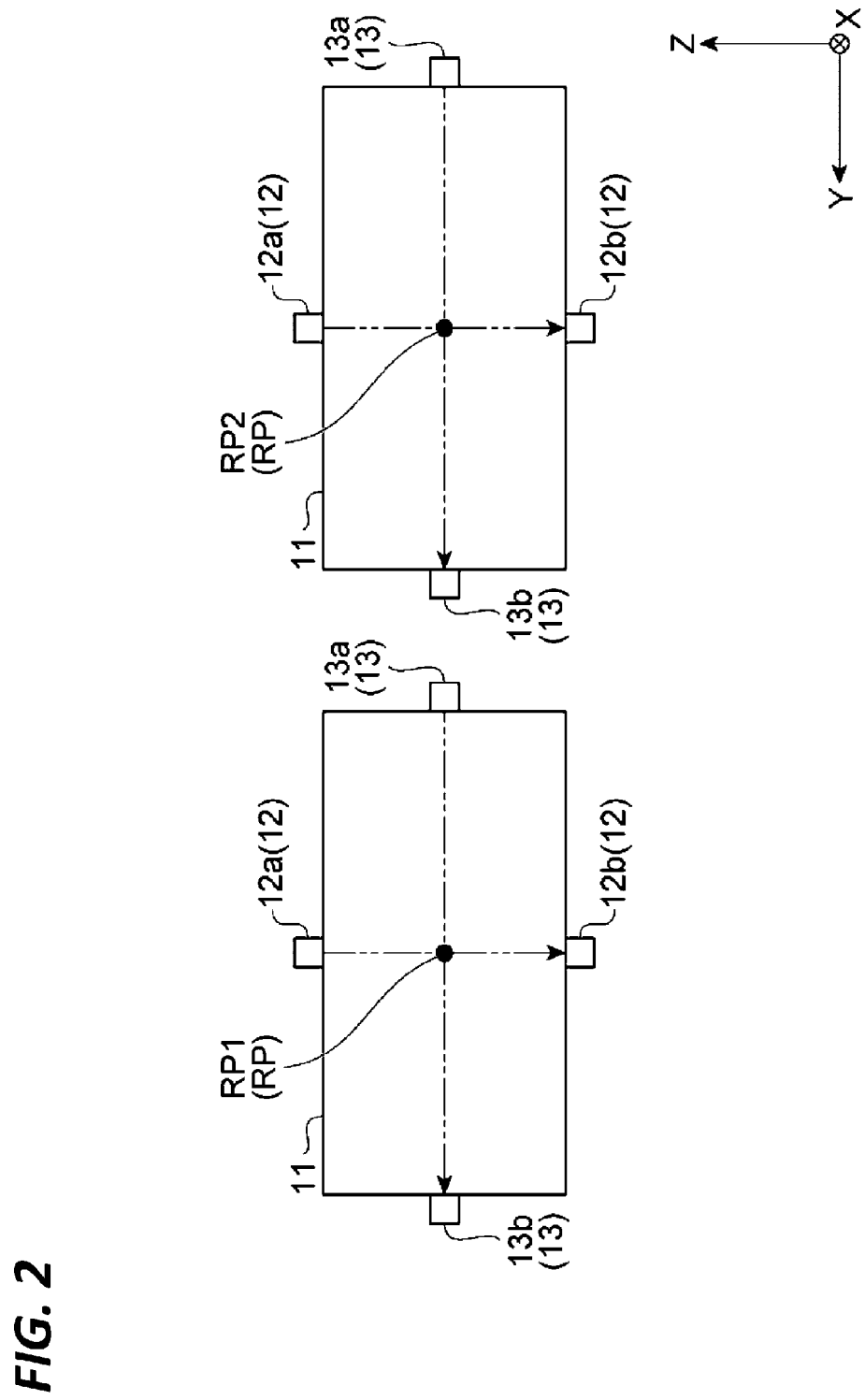
FIG. 2 is a schematic view illustrating a carry-in port of a processing station.

As illustrated in FIG. 2, a reference position RP is set in advance in each processing station 10. The reference position RP is used for the calibration of the position of the hand 30 with respect to the processing station 10. For example, in the processing station 10A, a first position RP1 which is the center of the carry-in port 11 is set as the reference position RP, and in the processing station 10B, a second position RP2 which is the center of the carry-in port 11 is set as the reference position RP.

The processing station 10 further includes a vertical sensor 12 and a horizontal sensor 13 for detecting the presence or absence of an object (e.g., a workpiece W) at the reference position RP. The vertical sensor 12 includes a light emitting unit 12a and a light receiving unit 12b. The light emitting unit 12a and the light receiving unit 12b are provided vertically above and below the reference position RP, respectively, at the edge of the carry-in port 11. The light emitting unit 12a emits light that passes through the reference position RP, vertically downward. Hereinafter, this light will be referred to as "vertical detection light." The light receiving unit 12b receives the vertical detection light. Alternatively, the light emitting unit 12a may be provided vertically below the reference position RP.

When no object exists at the position that overlaps with the reference position RP in the horizontal direction within the carry-in port 11, the light receiving unit 12b receives the vertical detection light. When an object exists at the position that overlaps with the reference position RP in the horizontal direction within the carry-in port 11, the light receiving unit 12b does not receive the vertical detection light. Accordingly, it may be detected whether an object exists at the position that overlaps with the reference position RP in the horizontal direction, based on the light receiving state of the light receiving unit 12b.

The horizontal sensor 13 includes a light emitting unit 13a and a light receiving unit 13b. The light emitting unit 13a and the light receiving unit 13b are provided at two positions with the same height as the reference position RP (e.g., the right and left positions as illustrated in FIG. 2), respectively, at the edge of the carry-in port 11. The light emitting unit 13a emits light that passes through the reference position RP, in the horizontal direction. Hereinafter, this light will be referred to as "horizontal detection light." The light receiving unit 13b receives the horizontal detection light. In addition, the light emitting unit 13a and the light receiving unit 13b may be provided at the left and right positions, respectively, as illustrated in FIG. 2.

When no object exists at the position that overlaps with the reference position RP in the vertical direction within the carry-in port 11, the light receiving unit 13b receives the horizontal detection light. When an object exists at the position that overlaps with the reference position RP in the vertical direction within the carry-in port 11, the light receiving unit 13b does not receive the horizontal detection light. Accordingly, it may be detected whether an object exists at the position that overlaps with the reference position RP in the vertical direction, based on the light receiving state of the light receiving unit 13b.

Figure 3:
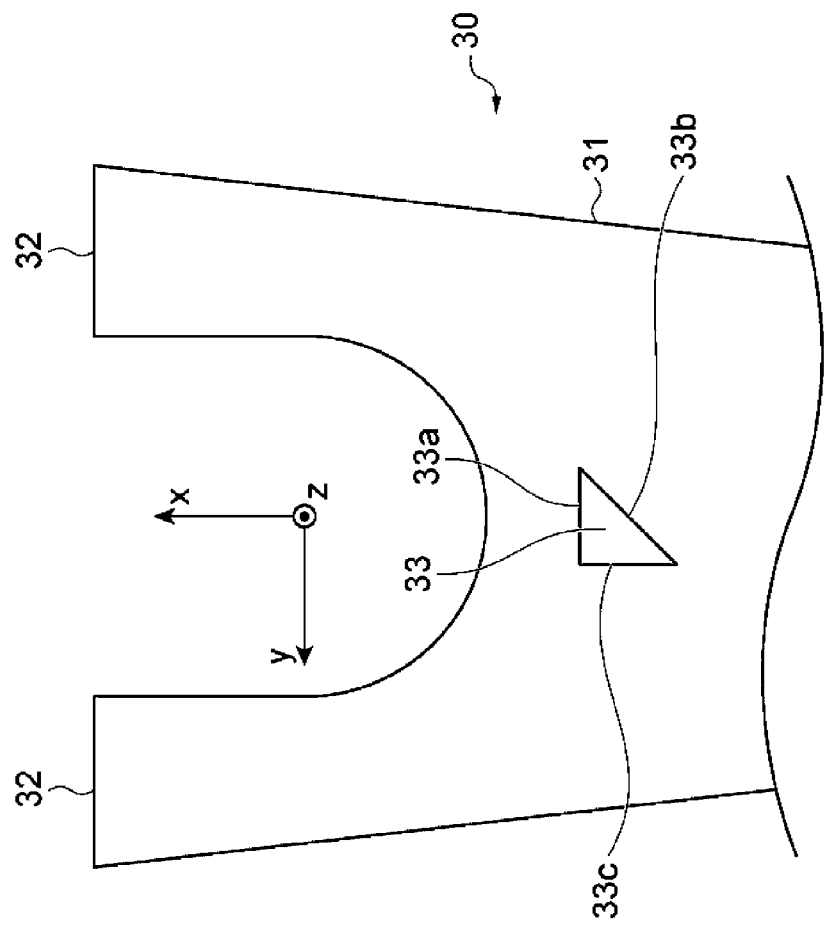
FIG. 3 is an enlarged view illustrating an indicator.

As illustrated in FIG. 3, the hand 30 is provided with an indicator 33 that serves as a target to be detected by the vertical sensor 12. Hereinafter, in the descriptions of the indicator 33, for example, a hand coordinate system fixed to the hand 30 will be used. The hand coordinate system is a coordinate system in which the protruding direction of the fingers 32 is the positive direction of the x axis, and the vertically upward direction is the positive direction of the z axis. The indicator 33 has a first line and a second line that, at least, are not parallel with each other. Both the first line and the second line intersect the x axis. The indicator 33 may further have a third line that is not parallel with both the first line and the second line.

For example, the indicator 33 is a triangular opening provided to be fixed in the base 31 in the present embodiment. More specifically, for example, the indicator 33 is an isosceles right triangle with a side 33a provided to be orthogonal to the x axis (e.g., along the y axis), a side 33c provided along the x axis (e.g., orthogonal to the y axis), and a side 33b provided to intersect the sides 33a and 33c. The side 33a corresponds to the first line, the side 33b corresponds to the second line, and the side 33c corresponds to the third line. The indicator 33 is provided such that the midpoint of the side 33a is positioned in the central line of the hand 30 in the y-axis direction.

The indicator 33 illustrated in FIG. 3 is merely an example but may have any other form. For example, the indicator 33 may be provided in any other form as long as the indicator 33 includes the first line and the second line which are not parallel with each other in the form that the indicator 33 is detectable by the vertical sensor 12. In addition, since the indicator 33 may be fixed to the hand 30 at least when the calibration of the position of the hand 30 with respect to the processing station 10 is performed, the indicator 33 may be provided in, for example, a jig attachable to a predetermined position of the hand 30.

(Controller)

In a case where the installation position of the arm 40 (e.g., the installation position of the base mount 41) deviates from a designed installation position and when the hand 30 is moved according to the target position/target posture/target height based on the designed installation position, the placement of the workpiece W in the processing station 10 may deviate. Thus, the controller 100 is configured to further perform a calibration for correcting the target position/target posture/target height in accordance with the actual installation state of the arm 40.

For example, the controller 100 is configured to move the hand 30 by the arm 40 along a scanning direction (e.g., along the X-axis direction) that intersects the first line and the second line provided in the hand 30, such that the first line and the second line pass a known reference position RP in the transfer path of the workpiece W, and to detect a positional deviation of the hand 30 in the direction intersecting the scanning direction (e.g., in the Y-axis direction) based on a timing at which the first line reaches the reference position RP and a timing at which the second line reaches the reference position RP, while the hand 30 is being moved along the scanning direction.

The controller 100 may be configured to further detect a positional deviation of the hand 30 in the scanning direction, based on the timing at which the first line reaches the reference position RP while the hand is being moved along the scanning direction. The controller 100 may be configured to move the hand 30 along the scanning direction at each of a first scanning position and a second scanning position which are different from each other in the direction intersecting the scanning direction, and to further detect an inclination of the hand 30 based on a timing at which the first line reaches the reference position RP while the hand is being moved at the first scanning position and a timing at which the first line reaches the reference position RP while the hand is being moved at the second scanning position. In addition, the controller 100 may be configured to correct the detection result of the positional deviation of the hand 30 based on the detection result of the inclination of the hand 30.

For example, the controller 100 includes a target position holding unit 111, a transfer controller 112, a scanning controller 113, a position detector 114, a movement command correction unit 115, and an installation failure notification unit 116, as functional components. The target position holding unit 111 stores a target position/target posture/target height of the hand 30 for placing the workpiece W at a processing position, for each processing station 10. Both the transfer controller 112 and the scanning controller 113 control the arm 40 based on the target position/target posture/target height stored in the target position holding unit 111. The transfer controller 112 moves the hand 30 by the arm 40 to carry in or out the workpiece W with respect to any one of the processing stations 10.

The scanning controller 113 moves the hand 30 by the arm 40 along the scanning direction such that the first line and the second line pass the reference position RP. For example, the scanning controller 113 moves the hand 30 by the arm 40 along the X-axis direction such that the sides 33a and 33b of the indicator 33 pass the reference position RP of any one of the processing stations 10, in a state where the tip end of the hand 30 faces the positive direction of the X axis of the robot coordinate system.

The scanning controller 113 may move the hand 30 by the arm 40 along the scanning direction at each of the first scanning position and the second scanning position which are different from each other in the direction intersecting the scanning direction. For example, the scanning controller 113 moves the hand 30 by the arm 40 along the X-axis direction at each of the first scanning position and the second scanning position which are different from each other in the Y-axis direction, in a state where the tip end of the hand 30 faces the positive direction of the X axis of the robot coordinate system. The first scanning position and the second scanning position are set such that both of the sides 33a and 33b pass the reference position RP at any of the first scanning position and the second scanning position. Hereinafter, the control for moving the hand 30 along the scanning direction at the first scanning position will be referred to as a "first scanning control," and the control for moving the hand 30 along the scanning direction at the second scanning position will be referred to as a "second scanning control."

The position detector 114 detects a positional deviation of the hand 30 in the direction (e.g., Y-axis direction) intersecting the scanning direction (e.g., X-axis direction), based on a timing at which the side 33a reaches the reference position RP and a timing at which the side 33b reaches the reference position RP, while the scanning controller 113 is moving the hand 30. For example, the position detector 114 detects a relative position of the hand 30 in the Y-axis direction with respect to the reference position RP, based on the movement stroke of the hand 30 from the timing at which the side 33a reaches the reference position RP to the timing at which the side 33b reaches the reference position RP. A more detailed calculation method will be described later.

The position detector 114 may further detect a positional deviation of the hand 30 in the scanning direction (e.g., X-axis direction), based on the timing at which the side 33a reaches the reference position RP while the scanning controller 113 is moving the hand 30. Specifically, the position detector 114 calculates a difference between the X coordinate of the position of the hand 30 at the timing when the side 33a reaches the reference position RP and the X coordinate of the position of the hand 30 at a scheduled timing when the side 33a reaches the reference position RP. In addition, the X coordinate is the X coordinate in the robot coordinate system. The scheduled timing is a timing at which the side 33a reaches the designed X coordinate of the reference position RP in the robot coordinate system. The designed X coordinate refers to an X coordinate in a case where the tolerance of the designed installation position of the arm 40 with respect to the reference position RP is zero.

The position detector 114 may further detect an inclination of the hand 30 (e.g., an inclination around the vertical axis), based on the timing at which the side 33a reaches the reference position RP in the first scanning control and the timing at which the side 33a reaches the reference position RP in the second scanning control. Here, the inclination of the hand 30 is an inclination of the protruding direction of the fingers 32 with respect to the scanning direction (e.g., X-axis direction).

For example, the position detector 114 calculates the inclination of the hand 30, based on the position of the hand 30 at the timing when the side 33a reaches the reference position RP in the first scanning control (hereinafter, referred to as the "reaching position of the side 33a in the first scanning control") and the position of the hand 30 at the timing when the side 33a reaches the reference position RP in the second scanning control (hereinafter, referred to as the "reaching position of the side 33a in the second scanning control"). Specifically, the position detector 114 calculates the inclination of the hand 30, based on the X and Y coordinates of the reaching position of the side 33a in the first scanning control and the X and Y coordinates of the reaching position of the side 33a in the second scanning control. In addition, the X and Y coordinates are the X and Y coordinates in the robot coordinate system. A more detailed calculation method will be described later. The position detector 114 may correct the detection result of the positional deviation of the hand 30 based on the detection result of the inclination of the hand 30. A more detailed correction method will be described later.

The movement command correction unit 115 corrects the target position of the hand 30 (the target position stored in the target position holding unit 111), to reduce the positional deviation of the hand 30 that has been detected by the position detector 114. For example, the movement command correction unit 115 corrects the target position of the hand 30 in the opposite direction to the direction of the positional deviation with the same correction amount as the positional deviation.

The movement command correction unit 115 may further correct the target posture of the hand 30 (the target posture stored in the target position holding unit 111), to reduce the inclination of the hand 30 that has been detected by the position detector 114. For example, the movement command correction unit 115 corrects a swivel angle target value of the hand 30 in the opposite direction to the direction in which the hand 30 is inclined, with the same correction amount as the angle at which the hand 30 is inclined.

The installation failure notification unit 116 notifies a user of an installation failure of the arm 40 when at least one of the positional deviation and the inclination of the hand 30 exceeds an allowable level. For example, when the inclination of the hand 30 detected by the position detector 114 exceeds the allowable level, the installation failure notification unit 116 notifies the user of the installation failure. Further, the installation failure notification unit 116 notifies the user of an installation failure of the arm 40 when the sides 33a and 33b of the indicator 33 do not pass the reference position RP at either the first scanning position or the second scanning position. For example, the installation failure notification unit 116 notifies the user of the installation failure of the arm 40, for example, by displaying the installation failure on a display device such as a liquid crystal monitor.

The scanning controller 113, the position detector 114, and the movement command correction unit 115 may repeat the movement of the hand 30 along the scanning direction, the detection of the positional deviation of the hand 30, and the correction of the target position of the hand 30, at a predetermined timing. In this case, when a difference between the current detection result obtained by the position detector 114 and the previous detection result obtained by the position detector 114 exceeds an allowable level, the installation failure notification unit 116 may notify the user of a deterioration of the arm 40 (e.g., a deterioration of, for example, a bearing, belt or speed reducer).

The controller 100 causes the scanning controller 113 to move the hand 30 using each of the first position and the second position which are different from each other (e.g., the first position RP1 and the second position RP2) as the reference position RP, and detects an inclination of the base mount 41 of the arm 40 based on a timing at which the side 33a reaches the first position RP1 while the scanning controller 113 is moving the hand 30 using the first position RP1 as the reference position RP and a timing at which the side 33a reaches the second position RP2 while the scanning controller 113 is moving the hand 30 using the second position RP2 as the reference position RP.

The controller 100 may be configured to move the hand 30 by the arm 40 along the scanning direction that intersects the first line and the second line, using each of the first position and the second position which are different from each other (e.g., the first position RP1 and the second position RP2) as the reference position RP, such that the first line and the second line pass the reference position RP, and configured to detect the inclination of the base mount 41 (base) of the arm 40 based on the timing at which the side 33a reaches the first position RP1 and the timing at which the side 33a reaches the second position RP2.

In addition, the controller 100 may be configured to correct the control command of the arm 40, so as to reduce the positional deviation of the hand 30 caused from the inclination of the base mount 41. For example, the controller 100 includes an arm inclination detector 121 and a pivoting command correction unit 122.

The arm inclination detector 121 causes the scanning controller 113 to move the hand 30 using each of the first position RP1 and the second position RP2 as the reference position RP, and detects the inclination of the base mount 41 of the arm 40 based on the timing at which the side 33a reaches the first position RP1 while the scanning controller 113 is moving the hand 30 using the first position RP1 as the reference position RP, and the timing at which the side 33a reaches the second position RP2 while the scanning controller 113 is moving the hand 30 using the second position RP2 as the reference position RP.

For example, the arm inclination detector 121 calculates the inclination of the hand 30 based on the position of the hand 30 at the timing when the side 33a reaches the first position RP1 (hereinafter, referred to as the "position of reaching to the first position RP1") and the position of the hand 30 at the timing when the side 33a reaches the second position RP2 (hereinafter, referred to as the "position of reaching to the second position RP2"). Specifically, the inclination of the base mount 41 is calculated based on the X and Y coordinates of the position of reaching to the first position RP1 in the robot coordinate system and the X and Y coordinates of the position of reaching to the second position RP2 in the robot coordinate system. A more detailed calculation method will be described later.

The pivoting command correction unit 122 (e.g., a command corrector) corrects the control command of the arm 40, to reduce the positional deviation of the hand 30 caused from the inclination of the base mount 41 detected by the arm inclination detector 121. For example, the pivoting command correction unit 122 corrects a swivel angle target value of the first arm 43 in the opposite direction to the direction in which the base mount 41 is inclined, with the same correction amount as the angle in which the base mount 41 is inclined. Based on the control command corrected by the pivoting command correction unit 122, the scanning controller 113 may move the hand 30 by the arm 40 along the scanning direction such that the sides 33a and 33b of the indicator 33 pass the reference position RP again. The position detector 114 may detect the position of the hand 30 again based on a timing at which the side 33a reaches the reference position RP again and a timing at which the side 33b reaches the reference position RP again.

The controller 100 may be further configured to move the hand 30 by the arm 40 along an intersecting scanning direction that intersects the scanning direction, such that either one of the first line or the second line, and the third line pass the reference position RP, and to further detect a positional deviation of the hand 30 in the direction intersecting the intersecting scanning direction based on a timing at which at least one of the first line and the second line reaches the reference position RP and a timing at which the third line reaches the reference position RP, while the hand 30 is being moved along the intersecting scanning direction.

For example, the controller 100 further includes an intersecting scanning controller 131. The intersecting scanning controller 131 moves the hand 30 by the arm 40 along the intersecting scanning direction which is orthogonal to the scanning direction, such that the second line and the third line pass the reference position RP. For example, the intersecting scanning controller 131 moves the hand 30 by the arm 40 along the Y-axis direction such that the sides 33c and 33b of the indicator 33 pass the reference position RP of any one of the processing stations 10, in a state where the tip end of the hand 30 faces the positive direction of the X axis of the robot coordinate system.

The intersecting scanning controller 131 may move the hand 30 by the arm 40 along the intersecting scanning direction at each of a third scanning position and a fourth scanning position which are different from each other in the direction orthogonal to the intersecting scanning direction. For example, the intersecting scanning controller 131 moves the hand 30 by the arm 40 along the Y-axis direction at each of the third scanning position and the fourth scanning position which are different from each other in the X-axis direction, in a state where the tip end of the hand 30 faces the positive direction of the X axis of the robot coordinate system.

The third scanning position and the fourth scanning position are set such that the sides 33c and 33b pass the reference position RP at any of the third scanning position and the fourth scanning position. Hereinafter, the control for moving the hand 30 along the intersecting scanning direction at the third scanning position will be referred to as a "third scanning control," and the control for moving the hand 30 along the intersecting scanning direction at the fourth scanning position will be referred to as a "fourth scanning control."

The position detector 114 may further detect a positional deviation of the hand 30 in the direction (e.g., X-axis direction) orthogonal to the intersecting scanning direction (e.g., Y-axis direction), based on the timing at which the side 33c reaches the reference position RP and the timing at which the side 33b reaches the reference position RP, while the intersecting scanning controller 131 is moving the hand 30. For example, the position detector 114 detects a relative position of the hand 30 in the X-axis direction with respect to the reference position RP, based on the movement stroke of the hand 30 from the timing at which the side 33c reaches the reference position RP to the timing at which the side 33b reaches the reference position RP. A more detailed calculation method will be described later.

The position detector 114 may further detect the positional deviation of the hand 30 in the intersecting scanning direction (Y-axis direction), based on the timing at which the side 33c reaches the reference position RP while the intersecting scanning controller 131 is moving the hand 30. Specifically, the position detector 114 calculates a difference between the Y coordinate of the position of the hand 30 at the timing when the side 33c reaches the reference position RP and the Y coordinate of the position of the hand 30 at a scheduled timing when the side 33c reaches the reference position RP. In addition, the Y coordinate is the Y coordinate in the robot coordinate system. The scheduled timing is a timing at which the side 33c reaches the designed Y coordinate of the reference position RP in the robot coordinate system. The designed Y coordinate refers to a Y coordinate in a case where the tolerance of the designed installation position of the arm 40 with respect to the reference position RP is zero.

The position detector 114 may further detect an inclination of the hand 30 (e.g., an inclination around the vertical axis), based on the timing at which the side 33c reaches the reference position RP in the third scanning control and the timing at which the side 33c reaches the reference position RP in the fourth scanning control. Here, the inclination of the hand 30 is an inclination of the protruding direction of the fingers 32 with respect to the scanning direction (e.g., X-axis direction). For example, the position detector 114 calculates the inclination of the hand 30 based on the position of the hand 30 at the timing when the side 33c reaches the reference position RP in the third scanning control (hereinafter, referred to as the "reaching position of the side 33c in the third scanning control"), and the position of the hand 30 at the timing when the side 33c reaches the reference position RP in the fourth scanning control (hereinafter, referred to as the "reaching position of the side 33c in the fourth scanning control"). Specifically, the position detector 114 calculates the inclination of the hand 30 based on the X and Y coordinates of the reaching position of the side 33c in the third scanning control and the X and Y coordinates of the reaching position of the side 33c in the fourth scanning control. In addition, the X and Y coordinates are the X and Y coordinates in the robot coordinate system. A more detailed calculation method will be described later.

The controller 100 may be configured to lift the hand 30 by the arm 40 such that the hand 30 passes the reference position RP, and to detect the height of the hand 30 based on a timing at which the hand 30 that is being lifted reaches the height of the reference position RP. The controller 100 may be configured to further detect the thickness of the hand 30 based on a timing at which the upper portion of the hand 30 reaches the height of the reference position RP and a timing at which the lower portion of the hand 30 reaches the height of the reference position RP.

The controller 100 may be configured to lift the hand 30 at each of a first height scanning position and a second height scanning position which are different from each other in a predetermined horizontal direction (hereinafter, referred to as the "shift direction"), and to further detect the inclination of the hand 30 based on a timing at which the hand 30 that is being lifted at the first height scanning position reaches the reference position RP and a timing at which the hand 30 that is being lifted at the second height scanning position reaches the reference position RP. For example, the controller 100 further includes a height scanning controller 141, a height detector 142, and a lifting command correction unit 143.

The height scanning controller 141 lifts the hand 30 by the arm 40 to pass the reference position RP. For example, the height scanning controller 141 lifts the hand 30 by the arm 40 to pass the reference position RP of any one of the processing stations 10, in a state where the tip end of the hand 30 faces the positive direction of the X axis of the robot coordinate system.

The height scanning controller 141 may lift the hand 30 by the arm 40 at each of the first height scanning position and the second height scanning position which are different from each other in the shift direction. For example, the height scanning controller 141 lifts the hand 30 by the arm 40 at each of the first height scanning position and the second height scanning position which are different from each other in the X-axis direction, in a state where the tip end of the hand 30 faces the positive direction of the X axis of the robot coordinate system. The first height scanning position and the second height scanning position are set such that the hand 30 passes the reference position RP at any of the first height scanning position and the second height scanning position. Hereinafter, the control for lifting the hand 30 at the first height scanning position will be referred to as a "first height scanning control," and the control for lifting the hand 30 at the second height scanning position will be referred to as a "second height scanning control."

The height detector 142 detects a height deviation of the hand 30 (e.g., a positional deviation of the hand 30 in the Z-axis direction) based on the timing at which the hand 30 reaches the height of the reference position RP while the height scanning controller 141 is lifting the hand 30. Specifically, a difference between the Z coordinate of the position of the hand 30 at a timing when the upper or lower portion of the hand 30 reaches the height of the reference position RP and the Z coordinate of the position of the hand 30 at a scheduled timing when the upper or lower portion of the hand 30 reaches the height of the reference position RP is calculated. In addition, the Z coordinate is the Z coordinate in the robot coordinate system. The scheduled timing is a timing at which the upper or lower portion of the hand 30 reaches the designed Z coordinate of the reference position RP in the robot coordinate system. The designed Z coordinate refers to a Z coordinate in a case where the tolerance of the designed installation height of the arm 40 with respect to the reference position RP is zero.

The height detector 142 may detect the thickness of the hand 30 based on the timing at which the upper portion of the hand 30 reaches the height of the reference position RP and at the timing when the lower portion of the hand 30 reaches the height of the reference position RP, while the height scanning controller 141 is lifting the hand 30. For example, the height detector 142 detects, as the thickness of the hand 30, the lifting stroke of the hand 30 from the timing at which the upper portion of the hand 30 reaches the height of the reference position RP to the timing at which the lower portion of the hand 30 reaches the height of the reference position RP.

The height detector 142 may further detect the inclination of the hand 30 based on the timing at which the upper or lower portion of the hand 30 reaches the height of the reference position RP in the first height scanning control and the timing at which the upper or lower portion of the hand 30 reaches the height of the reference position RP in the second height scanning control. Here, the inclination of the hand 30 is an inclination of the protruding direction of the fingers 32 with respect to the shift direction (e.g., X-axis direction). For example, the height detector 142 calculates the inclination of the hand 30 based on the X and Z coordinates of the position of the hand 30 at the timing when the upper or lower portion of the hand 30 reaches the height of the reference position RP in the first height scanning control, and the X and Z coordinates of the position of the hand 30 at the timing when the upper or lower portion of the hand 30 reaches the height of the reference position RP in the second height scanning control. In addition, the Z coordinate is the Z coordinate in the robot coordinate system. When the inclination of the hand 30 detected by the height detector 142 exceeds an allowable level, the installation failure notification unit 116 notifies the user of the installation failure.

The lifting command correction unit 143 corrects the target height of the hand 30 (e.g., the target position in the Z-axis direction that is stored in the target position holding unit 111), to reduce the height deviation of the hand 30 detected by the height detector 142. For example, the lifting command correction unit 143 corrects the target height of the hand 30 in the opposite direction to the direction of the height deviation with the same correction amount as the height deviation.

Figure 5:
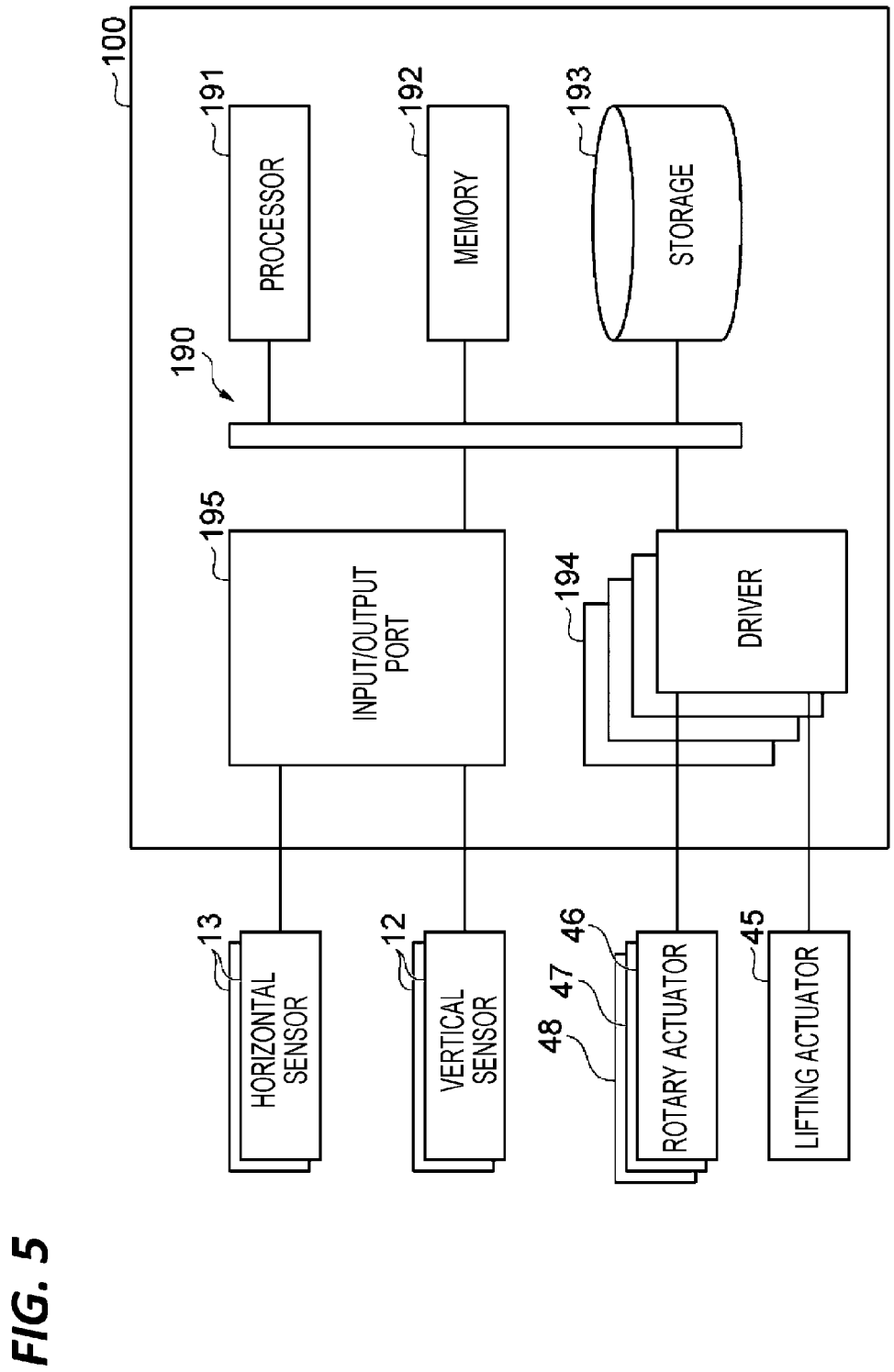
FIG. 5 is a block diagram illustrating a hardware configuration of the controller.

FIG. 5 is a block diagram illustrating a hardware configuration of the controller 100. As illustrated in FIG. 5, circuitry 190 includes one or more processors 191, a memory 192, a storage 193, a driver 194, and an input/output port 195. The storage 193 includes a computer-readable storage medium such as a non-volatile semiconductor memory. The storage 193 stores programs for causing the controller 100 to execute moving the hand 30 by the arm

40 along the scanning direction that intersects the first line and the second line such that the first line and the second line pass the reference position RP, and detecting the positional deviation of the hand 30 in the direction intersecting the scanning direction, based on the timing at which the first line reaches the reference position RP and the timing at which the second line reaches the reference position RP, while the hand 30 is being moved along the scanning direction. For example, the storage 193 stores a program for configuring each functional module of the controller 100. The memory 192 temporarily stores the program loaded from the storage medium of the storage 193 and a calculation result obtained by each processor 191. The processor 191 configures each functional module of the controller 100 by executing the program described above in cooperation with the memory 192. The driver 194 drives the lifting actuator 45 and the rotary actuators 46, 47, and 48 of the arm 40 according to a command from the processor 191. The input/output port 195 performs an input/output of an electrical signal with respect to the vertical sensor 12 and the horizontal sensor 13 according to a command from the processor 191. In addition, the circuitry 190 is not necessarily limited to the case where each function is configured by a program. For example, in the circuitry 190, at least a portion of functions may be configured by dedicated logic circuits or an ASIC (application specific integrated circuit) in which dedicated logic circuits are integrated.

[Calibration Procedure]

The controller 100 performs a transfer control of moving the hand 30 by the arm 40 to carry in or out the workpiece W to/from any one of the processing stations 10. The method of the transfer control includes a procedure for performing the calibration of the position of the hand 30 with respect to the processing station 10. The calibration procedure is performed, for example, when the arm 40 is installed or replaced. In addition, the calibration procedure may be repeatedly performed at a predetermined timing.

The calibration procedure includes moving the hand 30 by the arm 40 along the scanning direction that intersects the first line and the second line such that the first line and the second line pass the reference position RP, and detecting the positional deviation of the hand 30 in the direction intersecting the scanning direction, based on the timing at which the first line reaches the reference position RP and the timing at which the second line reaches the reference position RP, while the hand 30 is being moved along the scanning direction.

Figure 6:
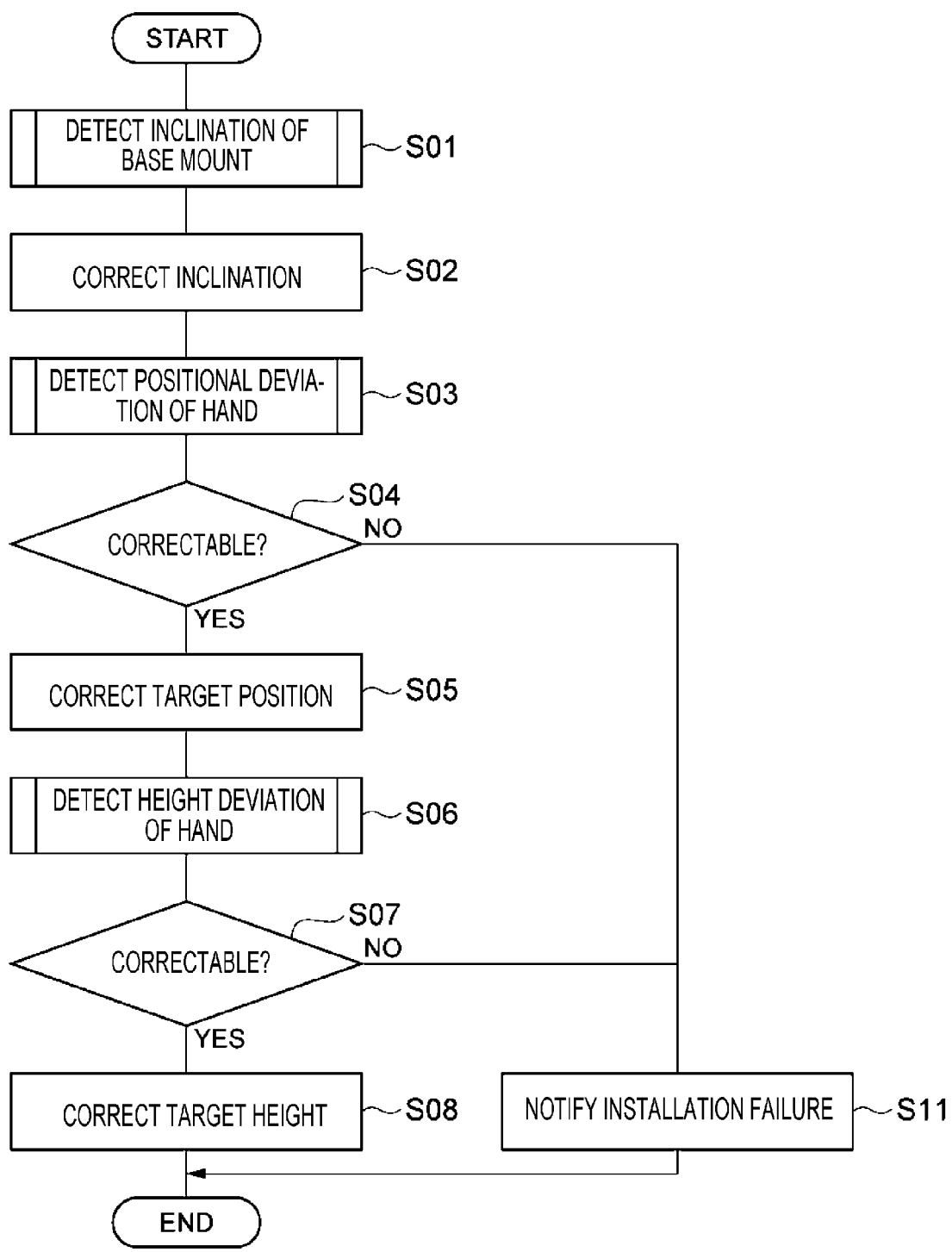
FIG. 6 is a flowchart illustrating a calibration procedure.

For example, as illustrated in FIG. 6, the controller 100 first performs steps S01 and S02. In step S01, the arm inclination detector 121 causes the scanning controller 113 to move the hand 30 using each of the first position RP1 and the second position RP2 as the reference position RP, and detects the inclination of the base mount 41 of the arm 40 based on the timing at which the side 33a reaches the first position RP1 while the scanning controller 113 is moving the hand 30 using the first position RP1 as the reference position RP, and the timing at which the side 33a reaches the second position RP2 while the scanning controller 113 is moving the hand 30 using the second position RP2 as the reference position RP. The specific contents of step S01 will be described later. In step S02, the pivoting command correction unit 122 corrects the control command of the arm 40, to reduce the positional deviation of the hand 30 caused from the inclination of the base mount 41 that has been detected by the arm inclination detector 121. For example, the pivoting command correction unit 122 corrects the swivel angle target value of the first arm 43 in the opposite direction to the direction in which the base mount 41 is inclined, with the same correction amount as the angle in which the base mount 41 is inclined.

Next, the controller 100 performs steps S03 and S04. In step S03, the scanning controller 113 moves the hand 30 by the arm 40 along the scanning direction such that the sides 33a and 33b pass the reference position RP, and the position detector 114 detects the positional deviation of the hand 30 based on the timing at which the side 33a reaches the reference position RP and the timing at which the side 33b reaches the reference position RP. The specific contents of step S03 will be described later. In step S04, the installation failure notification unit 116 confirms whether the positional deviation and the inclination of the hand 30 are within the allowable level.

When it is determined in step S04 that the positional deviation and the inclination of the hand 30 are within the allowable level, the controller 100 performs step S05. In step S05, the movement command correction unit 115 corrects the target position of the hand 30 (e.g., the target position stored in the target position holding unit 111), to reduce the positional deviation of the hand 30 that has been detected by the position detector 114. For example, the movement command correction unit 115 corrects the target position of the hand 30 in the opposite direction to the direction of the positional deviation with the same correction amount as the positional deviation. The movement command correction unit 115 may further correct the target posture of the hand 30 (e.g., the target posture stored in the target position holding unit 111), to reduce the inclination of the hand 30 that has been detected by the position detector 114. For example, the movement command correction unit 115 corrects the swivel angle target value of the hand 30 in the opposite direction to the direction in which the hand 30 is inclined, with the same correction amount as the angle at which the hand 30 is inclined.

Next, the controller 100 performs steps S06 and S07. In step S06, the height scanning controller 141 lifts the hand 30 by the arm 40 such that the hand 30 passes the reference position RP, and the height detector 142 detects the height deviation of the hand 30 based on the timing at which the hand 30 reaches the height of the reference position RP. The specific contents of step S06 will be described later. In step S07, the installation failure notification unit 116 confirms whether the height deviation of the hand 30 detected by the height detector 142 is within the allowable level.

When it is determined in step S07 that the height deviation of the hand 30 is within the allowable level, the controller 100 performs step S08. In step S08, the lifting command correction unit 143 corrects the target height of the hand 30 (e.g., the target position in the Z-axis direction that is stored in the target position holding unit 111), to reduce the height deviation of the hand 30 detected by the height detector 142.

When it is determined in step S04 that the positional deviation and the inclination of the hand 30 are not within the allowable level, and when it is determined in step S07 that the height deviation of the hand 30 is not within the allowable level, the controller 100 performs step S11. In step S11, the installation failure notification unit 116 notifies the user of the installation failure of the arm 40. With this step, the calibration procedure is completed. In addition, the controller 100 may perform steps S06, S07, and S08 before step S03. In addition, the controller 100 may omit at least one of steps S05 and S08.

(Procedure for Detection of Inclination of Base Mount)

Subsequently, a procedure for detecting the inclination of the base mount 41 in step S01 will be specifically described.

Figure 7:
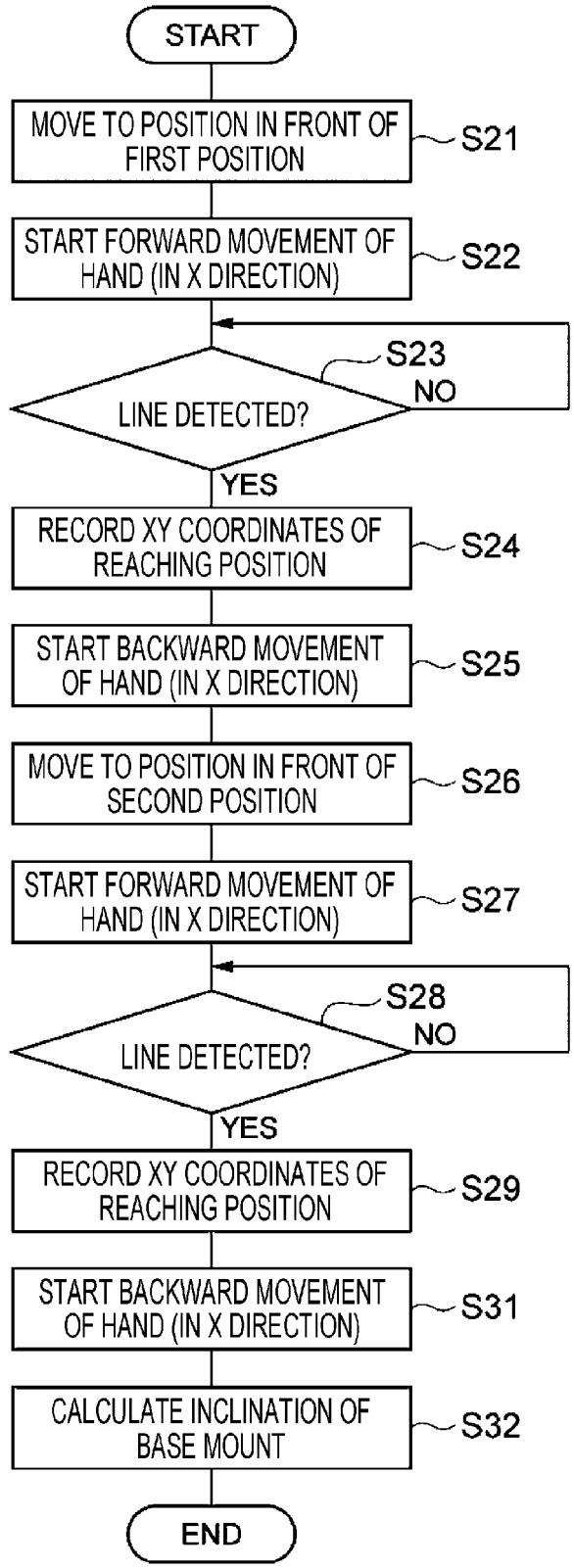
FIG. 7 is a flowchart illustrating a procedure for detecting an inclination of a base mount.

As illustrated in FIG. 7, the controller 100 first performs steps S21 and S22. In step S21, the arm inclination detector 121 requests the scanning controller 113 to place the hand 30 at a start position of the movement using the first position RP1 as the reference position RP. According to the request, the scanning controller 113 moves the hand 30 by the arm 40 such that the tip end of the hand 30 faces the positive direction of the X axis at a position in front of the first position RP1 (e.g., on the side of the negative direction of the X axis from the first position RP1). In step S22, the arm inclination detector 121 requests the scanning controller 113 to start the movement of the hand 30 using the first position RP1 as the reference position RP. According to the request, the scanning controller 113 controls the arm 40 to start the movement of the hand 30 in the positive direction of the X axis.

Next, the controller 100 performs steps S23, S24, and S25. In step S23, the arm inclination detector 121 waits for the detection of the side 33a by the vertical sensor 12 of the processing station 10A. In step S24, the arm inclination detector 121 acquires the X and Y coordinates (e.g., X and Y coordinates in the robot coordinate system) of the position of reaching to the first position RP1, from the scanning controller 113. In step S25, the arm inclination detector 121 requests the scanning controller 113 to move the hand 30 back to the start position of the movement using the first position RP1 as the reference position RP. According to the request, the scanning controller 113 moves the hand 30 by the arm 40 along the negative direction of the X axis until the hand 30 reaches the start position.

Next, the controller 100 performs steps S26 and S27. In step S26, the arm inclination detector 121 requests the scanning controller 113 to place the hand 30 at a start position of the movement using the second position RP2 as the reference position RP. According to the request, the scanning controller 113 moves the hand 30 by the arm 40 such that the tip end of the hand 30 faces the positive direction of the X axis at a position in front of the second position RP2 (e.g., on the side of the negative direction of the X axis from the second position RP2). In step S27, the arm inclination detector 121 requests the scanning controller 113 to start the movement of the hand 30 using the second position RP2 as the reference position RP. According to the request, the scanning controller 113 controls the arm 40 to start the movement of the hand 30 in the positive direction of the X axis.

Figure 8:
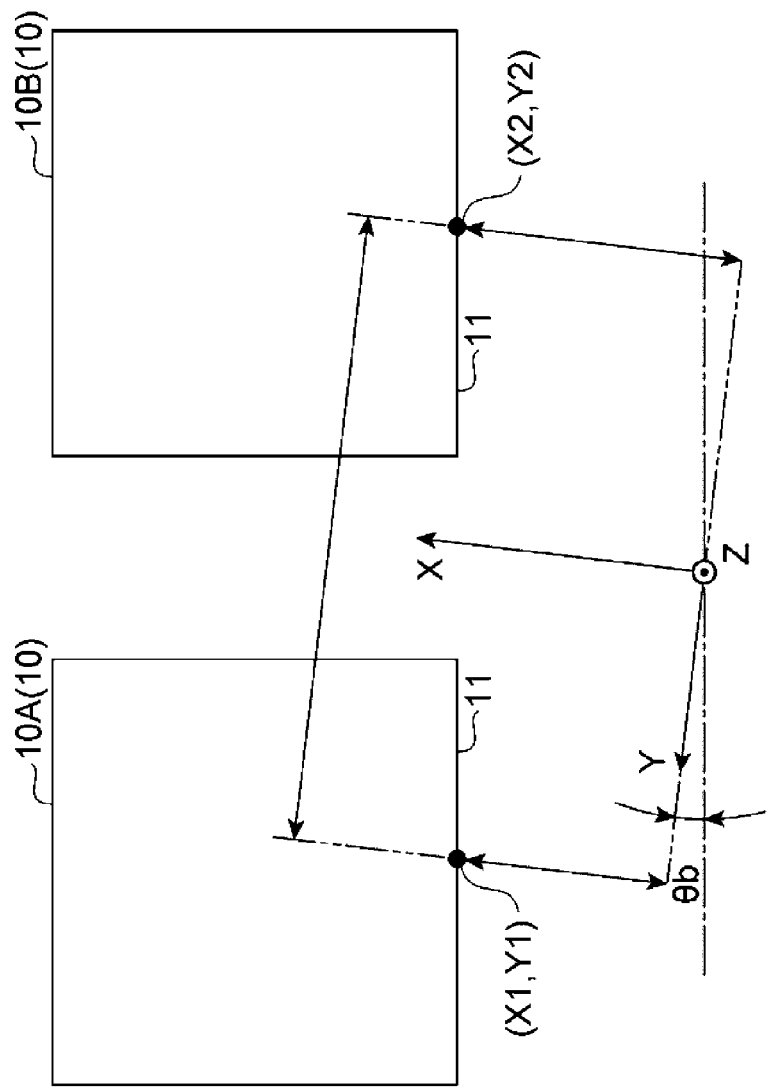
FIG. 8 is a schematic view illustrating a relationship between coordinates of a reaching position and the inclination of the base mount.

Next, the controller 100 performs steps S28, S29, S31, and S32. In step S28, the arm inclination detector 121 waits for the detection of the side 33a by the vertical sensor 12 of the processing station 10B. In step S29, the arm inclination detector 121 acquires the X and Y coordinates (e.g., X and Y coordinates in the robot coordinate system) of the position of reaching to the second position RP2, from the scanning controller 113. In step S31, the arm inclination detector 121 requests the scanning controller 113 to move the hand 30 back to the start position of the movement using the second position RP2 as the reference position RP. According to the request, the scanning controller 113 moves the hand 30 by the arm 40 along the negative direction of the X axis until the hand 30 reaches the start position. In step S32, the arm inclination detector 121 calculates the inclination of the base mount 41 based on the X and Y coordinates of the position of reaching to the first position RP1 as acquired in step S24 and the X and Y coordinates of the position of reaching to the second position RP2 as acquired in step S29. For example, the arm inclination detector 121 calculates the inclination of the base mount 41 based on the following equation (see, e.g., FIG. 8).

$$\theta b = \tan^{-1}((X2-X1)/(Y2-Y1)) \quad (1)$$

θb: Inclination angle of the base mount 41
X1: X coordinate of the position of reaching to the first position RP1
Y1: Y coordinate of the position of reaching to the first position RP1
X2: X coordinate of the position of reaching to the second position RP2
Y2: Y coordinate of the position of reaching to the second position RP2

With these steps, the procedure for detecting the inclination of the base mount 41 is completed.

(Procedure for Detection of Positional Deviation of Hand 30)

Figure 9:
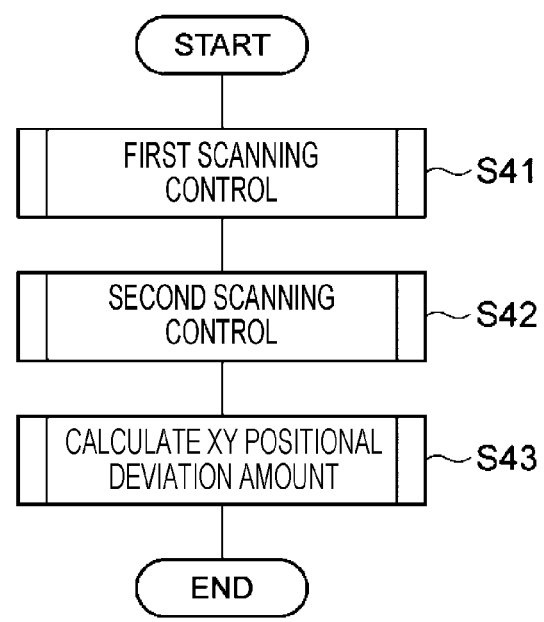
FIG. 9 is a flowchart illustrating a procedure for detecting a positional deviation of a hand.

Subsequently, a procedure for detecting the positional deviation of the hand 30 in step S03 will be specifically described. As illustrated in FIG. 9, the controller 100 performs steps S41, S42, and S43. In step S41, the scanning controller 113 performs the first scanning control, and the position detector 114 acquires information obtained during the first scanning control. In step S42, the scanning controller 113 performs the second scanning control, and the position detector 114 acquires information obtained during the second scanning control. In step S43, the position detector 114 calculates the positional deviation of the hand 30 based on the information acquired in steps S41 and S42.

Figure 10:
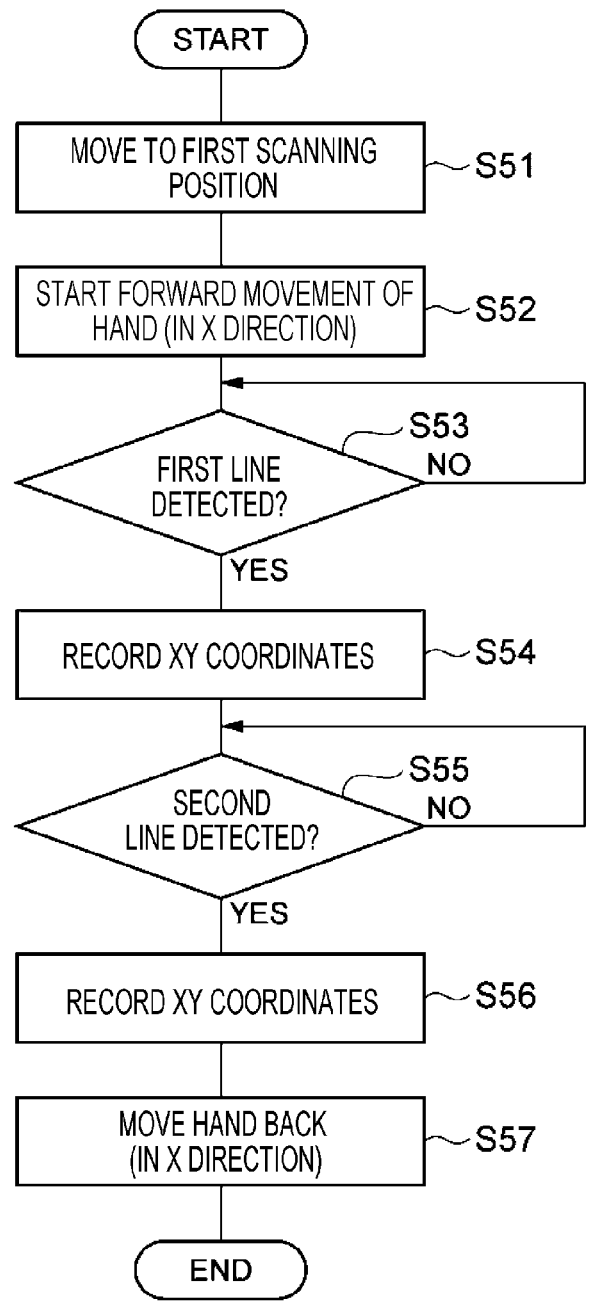
FIG. 10 is a flowchart illustrating a procedure of a first scanning control.

FIG. 10 is a flowchart illustrating the specific contents of step S41. As illustrated in FIG. 10, the controller 100 first performs steps SM and S52. In step SM, the scanning controller 113 controls the arm 40 to place the hand 30 at the first scanning position in front of the reference position RP (e.g., on the side of the negative direction of the X axis from the reference position RP), and to make the tip end of the hand 30 face the positive direction of the X axis. In step S52, the scanning controller 113 controls the arm 40 to start the movement of the hand 30 in the positive direction of the X axis.

Next, the controller 100 performs steps S53 and SM. In step S53, the position detector 114 waits for the detection of the side 33a by the vertical sensor 12 of the processing station 10. In step SM, the position detector 114 acquires the X and Y coordinates (e.g., X and Y coordinates in the robot coordinate system) of the position of the hand 30 at the timing when the side 33a reaches the reference position RP (hereinafter, referred to as the "reaching position of the side 33a in the first scanning control"), from the scanning controller 113.

Figure 12A:
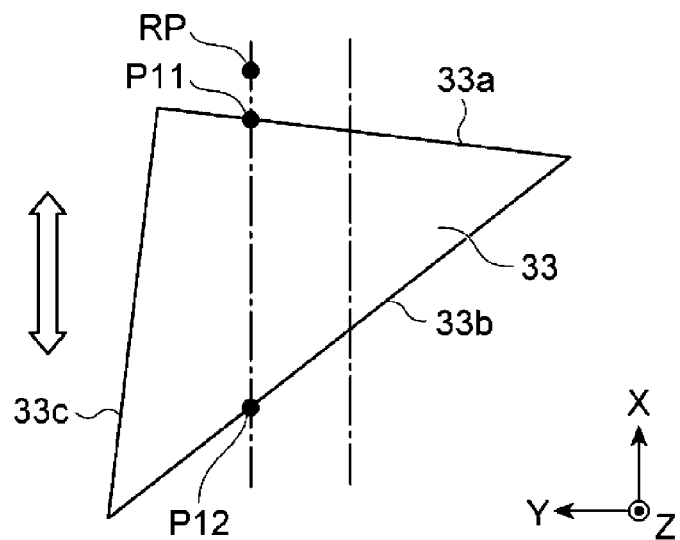
FIGS. 12A and 12B are schematic views illustrating movements of the hand in the first scanning control and the second scanning control.

Next, the controller 100 performs steps S55, S56, and S57. In step S55, the position detector 114 waits for the detection of the side 33b by the vertical sensor 12 of the processing station 10. In step S56, the position detector 114 acquires the X and Y coordinates (e.g., X and Y coordinates in the robot coordinate system) of the position of the hand 30 at the timing when the side 33b reaches the reference position RP (hereinafter, referred to as the "reaching position of the side 33b in the first scanning control"), from the scanning controller 113. In step S57, the scanning controller 113 moves the hand 30 by the arm 40 in the negative direction of the X axis until the hand 30 reaches the start position of the movement in step S52. As a result, the X and Y coordinates of the position of the hand 30 are acquired at a timing when a point P11 of the side 33a and a point P12 of the side 33b which are arranged in the X-axis direction reach the reference position RP (see, e.g., FIG. 12A).

Figure 11:
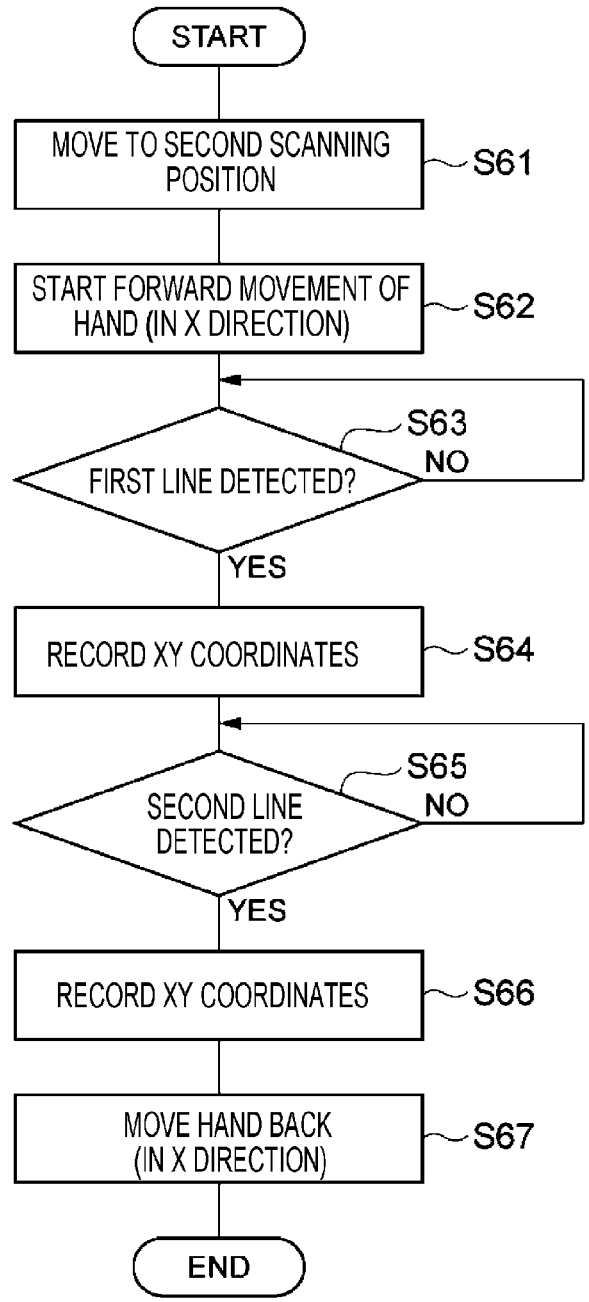
FIG. 11 is a flowchart illustrating a procedure of a second scanning control.

FIG. 11 is a flowchart illustrating the specific contents of step S42. As illustrated in FIG. 11, the controller 100 first performs steps S61 and S62. In step S61, the scanning controller 113 controls the arm 40 to place the hand 30 at the second scanning position in front of the reference position RP (e.g., on the side of the negative direction of the X axis from the reference position RP), and to make the tip end of the hand 30 face the positive direction of the X axis. In step S62, the scanning controller 113 controls the arm 40 to start the movement of the hand 30 in the positive direction of the X axis.

Next, the controller 100 performs steps S63 and S64. In step S63, the position detector 114 waits for the detection of the side 33a by the vertical sensor 12 of the processing station 10. In step S64, the position detector 114 acquires the X and Y coordinates (e.g., X and Y coordinates in the robot coordinate system) of the position of the hand 30 at the timing when the side 33a reaches the reference position RP (hereinafter, referred to as the "reaching position of the side 33a in the second scanning control"), from the scanning controller 113.

Figure 12B:
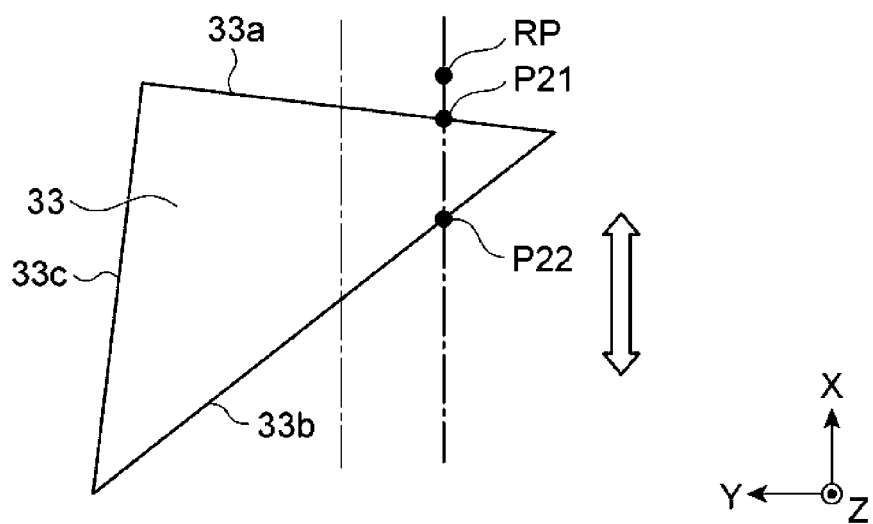

Next, the controller 100 performs steps S65, S66, and S67. In step S65, the position detector 114 waits for the detection of the side 33b by the vertical sensor 12 of the processing station 10. In step S66, the position detector 114 acquires the X and Y coordinates (e.g., X and Y coordinates in the robot coordinate system) of the position of the hand 30 at the timing when the side 33b reaches the reference position RP (hereinafter, referred to as the "reaching position of the side 33b in the second scanning control"), from the scanning controller 113. In step S67, the scanning controller 113 moves the hand 30 by the arm 40 in the negative direction of the X axis until the hand 30 reaches the start position of the movement in step S62. As a result, the X and Y coordinates of the position of the hand 30 are acquired at a timing when a point P21 of the side 33a and a point P22 of the side 33b which are arranged in the X-axis direction at positions different from the points P11 and P12 reach the reference position RP (see, e.g., FIG. 12B).

Figure 13:
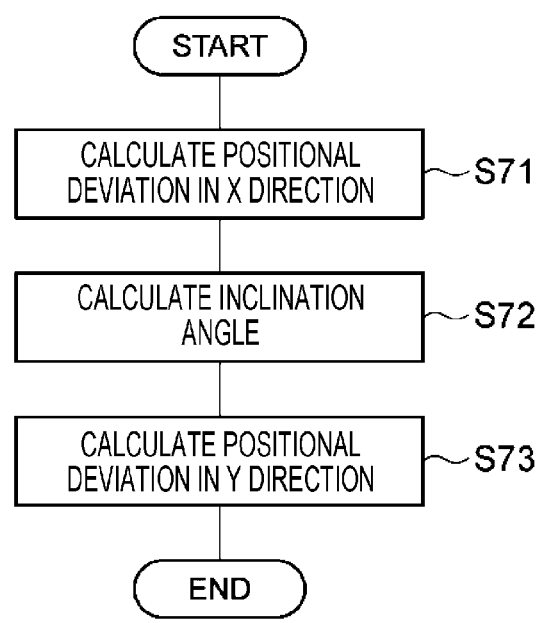
FIG. 13 is a flowchart illustrating a procedure for calculating the positional deviation of the hand.

FIG. 13 is a flowchart illustrating the specific contents of step S43. As illustrated in FIG. 13, the controller 100 performs steps S71, S72, and S73. In step S71, the position detector 114 calculates a difference between the X coordinate of the position of the hand 30 at the timing when the side 33a reaches the reference position RP (hereinafter, referred to as the "reaching position") and the X coordinate of the position of the hand 30 at a scheduled timing when the side 33a reaches the reference position RP. The position detector 114 may calculate an average value of the X coordinate of the reaching position of the side 33a in the first scanning control and the X coordinate of the reaching position of the side 33a in the second scanning control. For example, the position detector 114 calculates the X coordinate of the reaching position by the following equation.

$$Xr=(X11+X21)/2 \tag{2}$$

Figure 14:
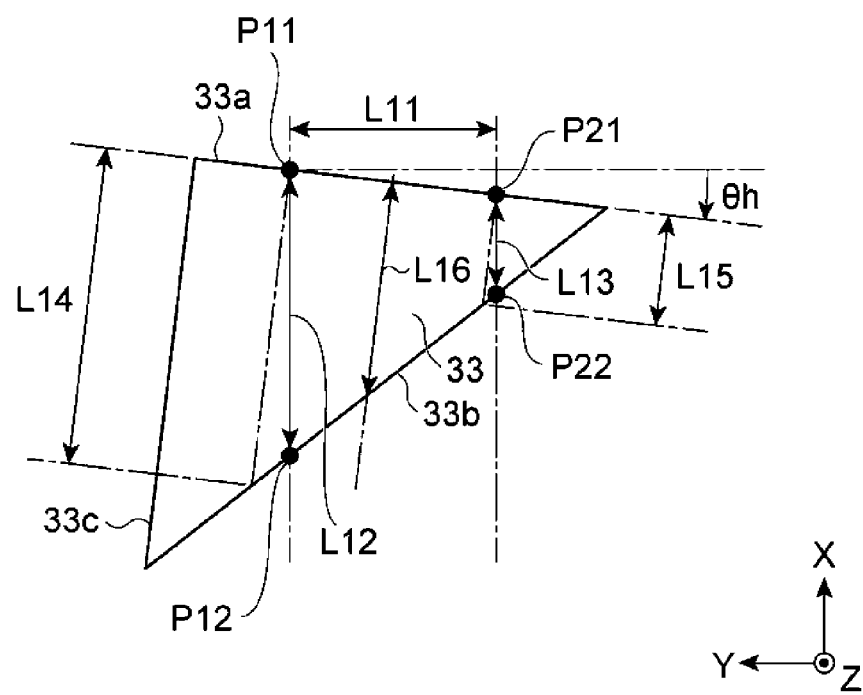
FIG. 14 is a schematic view illustrating a relationship between an inclination of the hand and movement strokes before and after a correction.

Xr: X coordinate of the reaching position
X11: X coordinate of the reaching position of the side 33a in the first scanning control
X21: X coordinate of the reaching position of the side 33a in the second scanning control In step S72, the position detector 114 detects the inclination of the hand 30, based on the timing at which the side 33a reaches the reference position RP in the first scanning control and the timing at which the side 33a reaches the reference position RP in the second scanning control. For example, the position detector 114 calculates the inclination of the hand 30 based on the X and Y coordinates of the reaching position of the side 33a in the first scanning control and the X and Y coordinates of the reaching position of the side 33a in the second scanning control. Specifically, the position detector 114 calculates the inclination of the hand 30 by the following equation (see, e.g., FIG. 14).

$$\theta h = \tan^{-1}((X11-X21)/(Y21-Y11)) \tag{3}$$

θh: Inclination angle of the hand 30
Y11: Y coordinate of the reaching position of the side 33a in the first scanning control
Y21: Y coordinate of the reaching position of the side 33a in the second scanning control In step S73, the position detector 114 detects the positional deviation of the hand 30 in the Y-axis direction based on the timing at which the side 33a reaches the reference position RP and the timing at which the side 33b reaches the reference position RP, while the scanning controller 113 is moving the hand 30. For example, the position detector 114 detects the relative position of the hand 30 in the Y-axis direction with respect to the reference position RP, based on the movement stroke of the hand 30 from the timing at which the side 33a reaches the reference position RP to the timing at which the side 33b reaches the reference position RP. The position detector 114 may correct the detection result of the positional deviation of the hand 30 based on the detection result of the inclination of the hand 30. Specifically, the position detector 114 calculates the movement stroke of the hand 30 in the Y-axis direction by the following equations.

$$L11=Y21-Y11 \tag{4}$$

$$L12=X12-X11 \tag{5}$$

$$L13=X22-X21 \tag{6}$$

$$L14=L12\cdot\cos(\theta h)+L12\cdot\sin(\theta h) \tag{7}$$

$$L15=L13\cdot\cos(\theta h)+L13\cdot\sin(\theta h) \tag{8}$$

$$L16=(L14+L15)/2 \tag{9}$$

L11: Stroke from the first scanning position to the second scanning position in the Y-axis direction (hereinafter, referred to as a "shift stroke")
X12: X coordinate of the reaching position of the side 33b in the first scanning control
X22: X coordinate of the reaching position of the side 33b in the second scanning control
L12: Movement stroke at the first scanning position (hereinafter, referred to as a "first movement stroke")
L13: Movement stroke at the second scanning position (hereinafter, referred to as a "second movement stroke")
L14: First movement stroke corrected by the inclination angle θh of the hand 30
L15: Second movement stroke corrected by the inclination angle θh of the hand 30
L16: Movement stroke In addition, the correction of the positional deviation of the hand 30 caused from the inclination of the hand 30 is performed by the equations (7) and (8) above. According to the correction, the first movement stroke and the second movement stroke are corrected to a stroke of a case where the inclination angle θh is zero.

Figure 15:
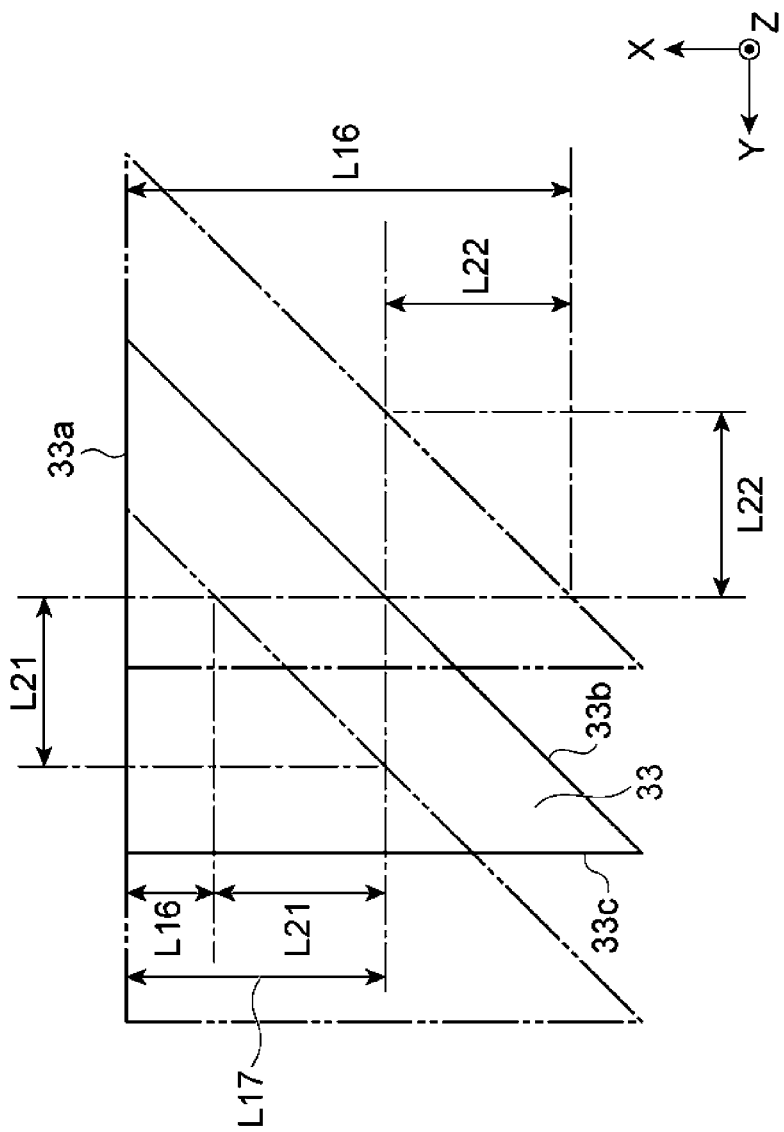
FIG. 15 is a schematic view illustrating a relationship between a movement stroke and the positional deviation of the hand.

The position detector 114 detects the positional deviation of the hand 30 in the Y-axis direction based on the movement stroke. For example, as illustrated in FIG. 15, when the movement stroke L16 is shorter than a movement stroke L17 that indicates a case where the positional deviation in the Y-axis direction is zero, the position detector 114 detects that the hand 30 deviates to the positive direction of the Y axis by a deviation amount corresponding to a stroke difference L21 between the movement stroke L17 and the movement stroke L16. In addition, when the movement stroke L16 is longer than the movement stroke L17, the position detector 114 detects that the hand 30 deviates to the negative direction of the Y axis by a deviation amount corresponding to a stroke difference L22 between the movement stroke L16 and the movement stroke L17.

In addition, as described above, the controller 100 may further include the intersecting scanning controller 131. The position detector 114 may further detect the positional deviation of the hand 30, based on the timing at which the side 33c reaches the reference position RP and the timing at which the side 33b reaches the reference position RP, while the intersecting scanning controller 131 is moving the hand 30. In this case, the position detector 114 may derive the positional deviation of the hand 30 by averaging the positional deviation of the hand 30 detected according to the movement of the hand 30 by the scanning controller 113 (hereinafter, referred to as the "scanning control") and the positional deviation of the hand 30 detected according to the movement of the hand 30 by the intersecting scanning controller 131 (hereinafter, referred to as the "intersecting scanning control"). Hereinafter, a procedure for the detection of the positional deviation of the hand 30 according to the intersecting scanning control will be described.

Figure 16:
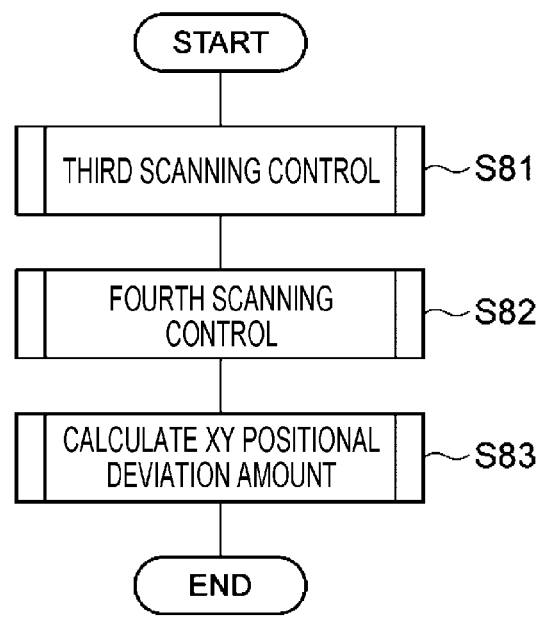
FIG. 16 is a flowchart illustrating a procedure for detecting the positional deviation of the hand by an intersecting scanning control.

As illustrated in FIG. 16, the controller 100 performs steps S81, S82, and S83. In step S81, the scanning controller 113 performs the third scanning control, and the position detector 114 acquires information obtained during the third scanning control. In step S82, the scanning controller 113 performs the fourth scanning control, and the position detector 114 acquires information obtained during the fourth scanning control. In step S83, the position detector 114 calculates the positional deviation of the hand 30 based on the information acquired in steps S81 and S82.

Figure 17:
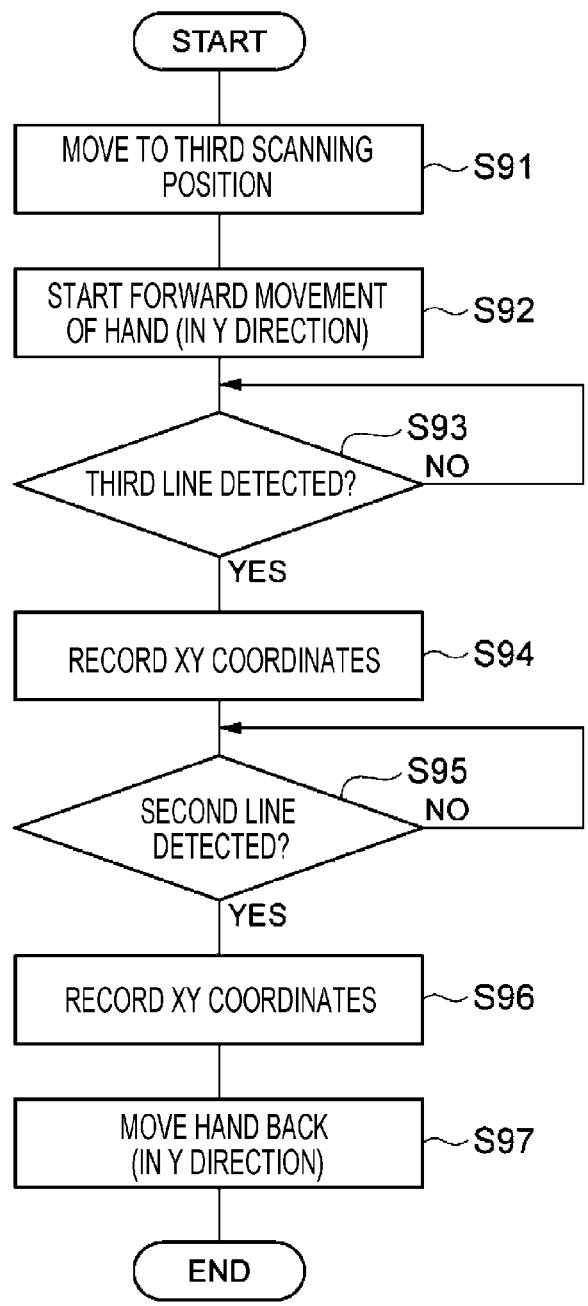
FIG. 17 is a flowchart illustrating a procedure of a third scanning control.

FIG. 17 is a flowchart illustrating the specific contents of step S81. As illustrated in FIG. 17, the controller 100 first performs steps S91 and S92. In step S91, the intersecting scanning controller 131 controls the arm 40 to place the hand 30 at the third scanning position in front of the reference position RP (on the side of the negative direction of the Y axis from the reference position RP), and to make the tip end of the hand 30 face the positive direction of the X axis. In step S92, the intersecting scanning controller 131 controls the arm 40 to start the movement of the hand 30 in the positive direction of the Y axis.

Next, the controller 100 performs steps S93 and S94. In step S93, the position detector 114 waits for the detection of the side 33c by the vertical sensor 12 of the processing station 10. In step S94, the position detector 114 acquires the X and Y coordinates (X and Y coordinates in the robot coordinate system) of the position of the hand 30 at the timing when the side 33c reaches the reference position RP (hereinafter, referred to as the "reaching position of the side 33c in the third scanning control"), from the intersecting scanning controller 131.

Figure 19A:
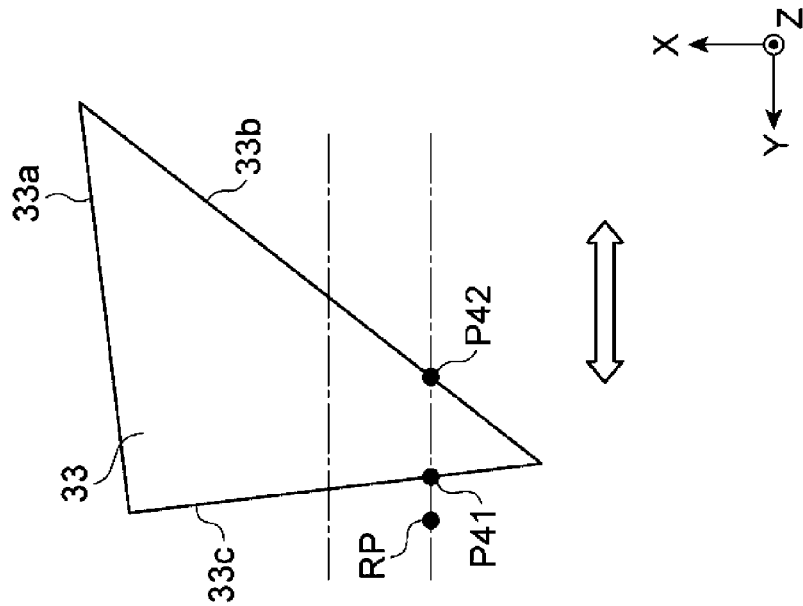
FIGS. 19A and 19B are schematic views illustrating movements of the hand in the third scanning control and the fourth scanning control.

Next, the controller 100 performs steps S95, S96, and S97. In step S95, the position detector 114 waits for the detection of the side 33b by the vertical sensor 12 of the processing station 10. In step S96, the position detector 114 acquires the X and Y coordinates (X and Y coordinates in the robot coordinate system) of the position of the hand 30 at the timing when the side 33b reaches the reference position RP (hereinafter, referred to as the "reaching position of the side 33b in the third scanning control"), from the intersecting scanning controller 131. In step S97, the intersecting scanning controller 131 moves the hand 30 by the arm 40 in the negative direction of the Y axis until the hand 30 reaches the start position of the movement in step S92. As a result, the X and Y coordinates of the position of the hand 30 are acquired at a timing when a point P31 of the side 33c and a point P32 of the side 33b which are arranged in the Y-axis direction reach the reference position RP (see, e.g., FIG. 19A).

Figure 18:
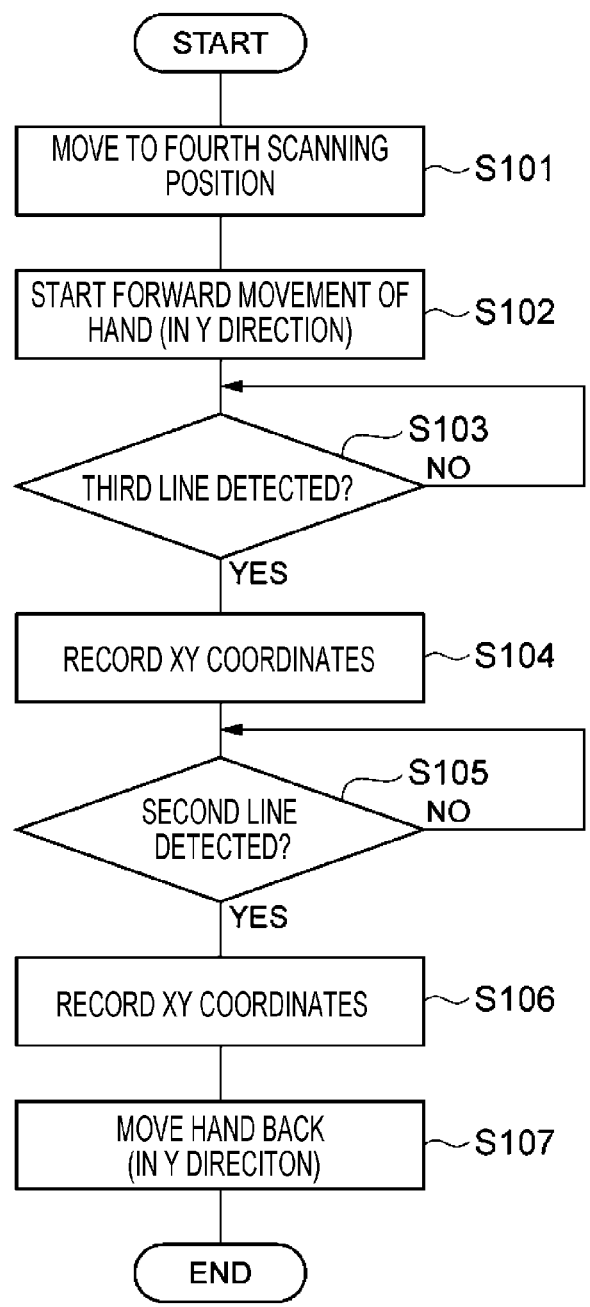
FIG. 18 is a flowchart illustrating a procedure of a fourth scanning control.

FIG. 18 is a flowchart illustrating the specific contents of step S82. As illustrated in FIG. 18, the controller 100 first performs steps S101 and S102. In step S101, the intersecting scanning controller 131 controls the arm 40 to place the hand 30 at the fourth scanning position in front of the reference position RP (on the side of the negative direction of the Y axis from the reference position RP), and to make the tip end of the hand 30 face the positive direction of the X axis. In step S102, the intersecting scanning controller 131 controls the arm 40 to start the movement of the hand 30 in the positive direction of the Y axis.

Next, the controller 100 performs steps S103 and S104. In step S103, the position detector 114 waits for the detection of the side 33c by the vertical sensor 12 of the processing station 10. In step S104, the position detector 114 acquires the X and Y coordinates (X and Y coordinates in the robot coordinate system) of the position of the hand 30 at the timing when the side 33c reaches the reference position RP (hereinafter, referred to as the "reaching position of the side 33c in the fourth scanning control"), from the intersecting scanning controller 131.

Figure 19B:
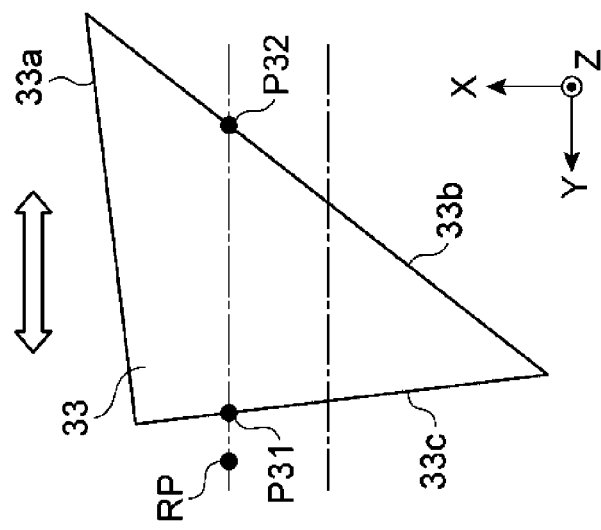

Next, the controller 100 performs steps S105, S106, and S107. In step S105, the position detector 114 waits for the detection of the side 33b by the vertical sensor 12 of the processing station 10. In step S106, the position detector 114 acquires the X and Y coordinates (X and Y coordinates in the robot coordinate system) of the position of the hand 30 at the timing when the side 33b reaches the reference position RP (hereinafter, referred to as the "reaching position of the side 33b in the fourth scanning control"), from the intersecting scanning controller 131. In step S107, the intersecting scanning controller 131 moves the hand 30 by the arm 40 in the negative direction of the Y axis until the hand 30 reaches the start position of the movement in step S102. As a result, the X and Y coordinates of the position of the hand 30 are acquired at a timing when a point P41 of the side 33c and a point P42 of the side 33b which are arranged in the Y-axis direction at positions different from the points P31 and P32 reach the reference position RP (see, e.g., FIG. 19B).

Figure 20:
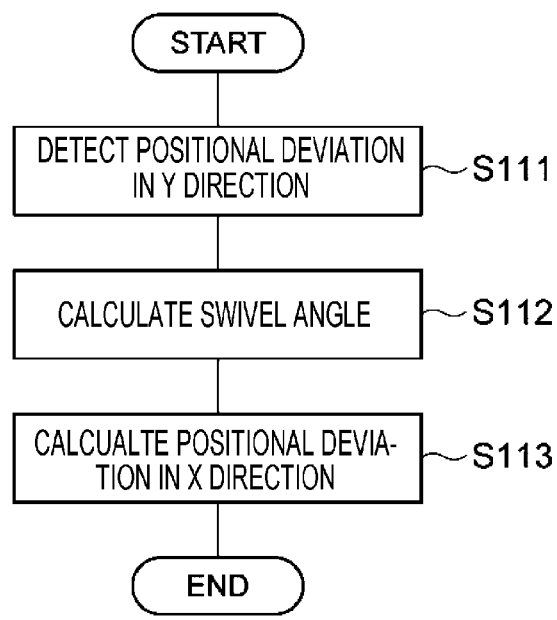
FIG. 20 is a flowchart illustrating a procedure for calculating the positional deviation of the hand.

FIG. 20 is a flowchart illustrating the specific contents of step S83. As illustrated in FIG. 20, the controller 100 performs steps S111, S112, and S113. In step S111, the position detector 114 calculates a difference between the Y coordinate of the position of the hand 30 at the timing when the side 33c reaches the reference position RP (hereinafter, referred to as the "reaching position") and the Y coordinate of the position of the hand 30 at a scheduled timing when the side 33c reaches the reference position RP. The position detector 114 may calculate an average value of the Y coordinate of the reaching position of the side 33c in the third scanning control and the Y coordinate of the reaching position of the side 33c in the fourth scanning control. For example, the position detector 114 calculates the Y coordinate of the reaching position by the following equation.

$$Yr=(Y31+Y41)/2 \quad (11)$$

Yr: Y coordinate of the reaching position
Y31: Y coordinate of the reaching position of the side 33c in the third scanning control
Y41: Y coordinate of the reaching position of the side 33c in the fourth scanning control In step S112, the position detector 114 calculates the inclination of the hand 30, based on the timing at which the side 33c reaches the reference position RP in the third scanning control and the timing at which the side 33c reaches the reference position RP in the fourth scanning control. For example, the position detector 114 calculates the inclination of the hand 30, based on the X and Y coordinates of the reaching position of the side 33c in the third scanning control, and the X and Y coordinates of the reaching position of the side 33c in the fourth scanning control. Specifically, the position detector 114 calculates the inclination of the hand 30 by the following equation.

$$\theta h=\tan^{-1}((Y31-Y41)/(X41-X31)) \quad (12)$$

θh: Inclination angle of the hand 30
X31: X coordinate of the reaching position of the side 33c in the third scanning control
X41: X coordinate of the reaching position of the side 33c in the fourth scanning control In step S113, the position detector 114 detects the positional deviation of the hand 30 in the X-axis direction, based on the timing at which the side 33c reaches the reference position RP and the timing at which the side 33b reaches the reference position RP, while the intersecting scanning controller 131 is moving the hand 30. For example, the position detector 114 detects the relative position of the hand 30 in the X-axis direction with respect to the reference position RP, based on the movement stroke of the hand 30 from the timing at which the side 33c reaches the reference position RP to the timing at which the side 33b reaches the reference position RP. The position detector 114 may correct the detection result of the positional deviation of the hand 30 based on the detection result of the inclination of the hand 30. Specifically, the position detector 114 calculates the movement stroke of the hand 30 in the X-axis direction by the following equations.

$$L31=X41-X31 \quad (13)$$

$$L32=Y32-Y31 \quad (14)$$

$$L33=Y42-Y41 \quad (15)$$

$$L34=L32\cdot\cos(\theta h)+L32\cdot\sin(\theta h) \quad (16)$$

$$L35=L33\cdot\cos(\theta h)+L33\cdot\sin(\theta h) \quad (17)$$

$$L36=(L34+L35)/2 \quad (18)$$

L31: Stroke from the third scanning position to the fourth scanning position in the X-axis direction (hereinafter, referred to as "shift stroke")
Y32: Y coordinate of the reaching position of the side 33b in the third scanning control
Y42: Y coordinate of the reaching position of the side 33b in the fourth scan control
L32: Movement stroke at the third scanning position (hereinafter, referred to as the "third movement stroke")
L33: Movement stroke at the fourth scanning position (hereinafter, referred to as the "fourth movement stroke")
L34: Third movement stroke corrected with the inclination angle θh of the hand 30
L35: Fourth movement stroke corrected by the inclination angle θh of the hand 30
L36: Movement stroke.

In addition, the correction of the positional deviation of the hand 30 caused from the inclination of the hand 30 is performed by the equations (16) and (17) above. According to the correction, the third movement stroke and the fourth movement stroke are corrected to a stroke of a case where the inclination angle θh is zero.

The position detector 114 detects the positional deviation of the hand 30 in the X-axis direction based on the movement stroke. For example, when the movement stroke L36 is shorter than a movement stroke L37 that indicates a case where the positional deviation in the X-axis direction is zero, the position detector 114 detects that the hand 30 deviates to the positive direction of the X axis by a deviation amount corresponding to a stroke difference between the movement stroke L37 and the movement stroke L36. In addition, when the movement stroke L36 is longer than the movement stroke L37, the position detector 114 detects that the hand 30 deviates to the negative direction of the X axis by a deviation amount corresponding to a stroke difference between the movement stroke L36 and the movement stroke L37.

(Procedure for Detection of Height Deviation of Hand 30)

Figure 21:
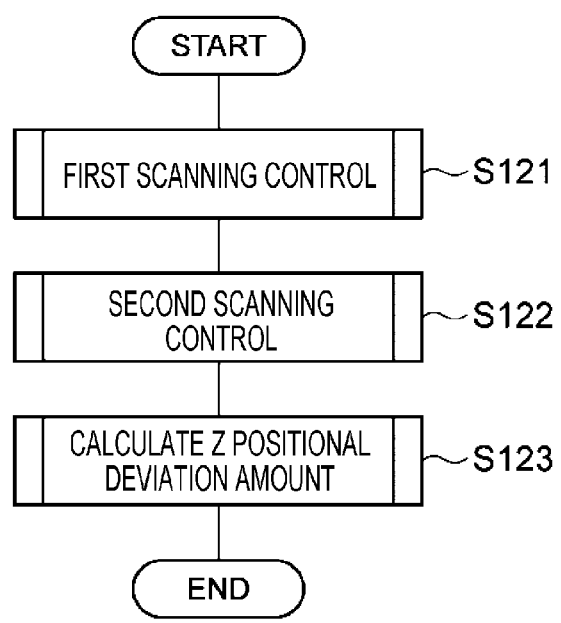
FIG. 21 is a flowchart illustrating a procedure for detecting a height deviation of the hand.

Subsequently, a procedure for the detection of the height deviation of the hand 30 in step S06 will be described. As illustrated in FIG. 21, the controller 100 performs steps S121, S122, and S123. In step S121, the height scanning controller 41 performs a first height scanning control, and the height detector 142 acquires information obtained during the first height scanning control. In step S122, the height scanning controller 141 performs a second height scanning control, and the height detector 142 acquires information obtained during the second height scanning control. In step S123, the height detector 142 calculates the height deviation of the hand 30 based on the information acquired in steps S121 and S122.

Figure 22:
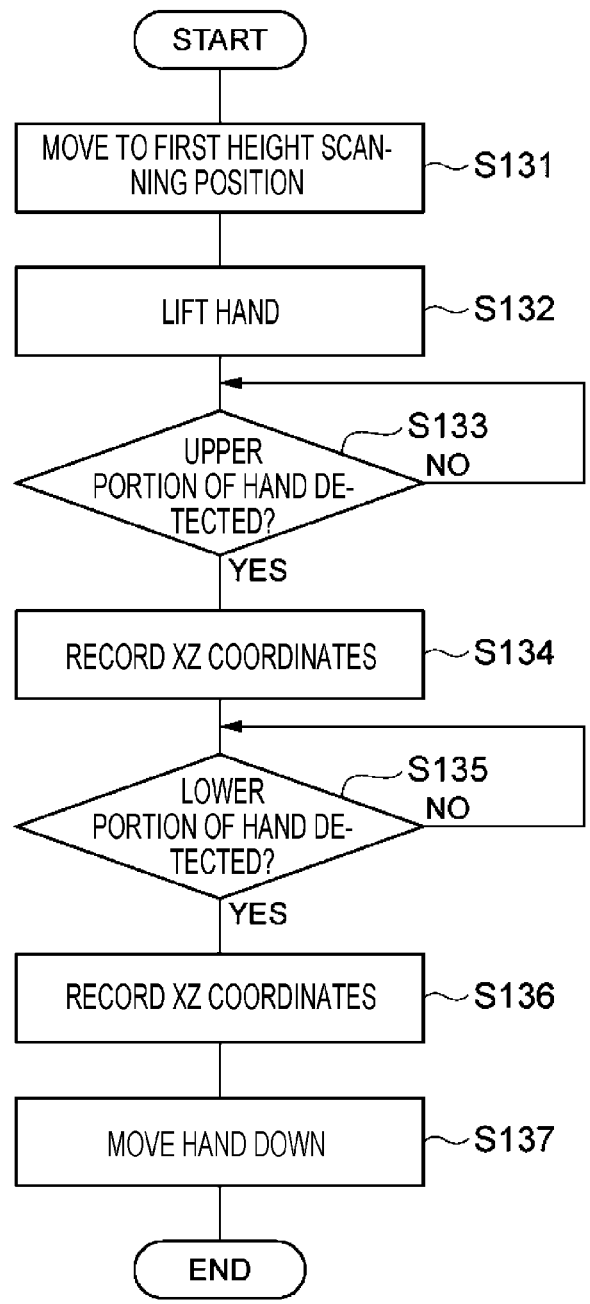
FIG. 22 is a flowchart illustrating a procedure of a first height scanning control.

FIG. 22 is a flowchart illustrating the specific contents of step S121. As illustrated in FIG. 22, the controller 100 first performs steps S131 and S132. In step S131, the height scanning controller 141 controls the arm 40 to place the hand 30 at the first height scanning position below the reference position RP, and to make the tip end of the hand 30 face the positive direction of the X axis. In step S132, the height scanning controller 141 controls the arm 40 to start the movement (lifting) of the hand 30 in the positive direction of the Z axis (e.g., a height scanning direction which is orthogonal to the scanning direction (e.g., X-axis direction)).

Next, the controller 100 performs steps S133 and S134. In step S133, the height detector 142 waits for the detection of the upper portion of the hand 30 by the horizontal sensor 13 of the processing station 10. In step S134, the height detector 142 acquires the Z coordinate (Z coordinate in the robot coordinate system) of the position of the hand 30 at the timing when the upper portion of the hand 30 reaches the height of the reference position RP (hereinafter, referred to as the "reaching position of the upper portion in the first height scanning control"), from the height scanning controller 141.

Next, the controller 100 performs steps S135, S136, and S137. In step S135, the height detector 142 waits for the detection of the lower portion of the hand 30 by the horizontal sensor 13 of the processing station 10. In step S136, the height detector 142 acquires the Z coordinate (Z coordinate in the robot coordinate system) of the position of the hand 30 at the timing when the lower portion of the hand 30 reaches the height of the reference position RP (hereinafter, referred to as the "reaching position of the lower portion in the first height scanning control"), from the height scanning controller 141.

Figure 24A:
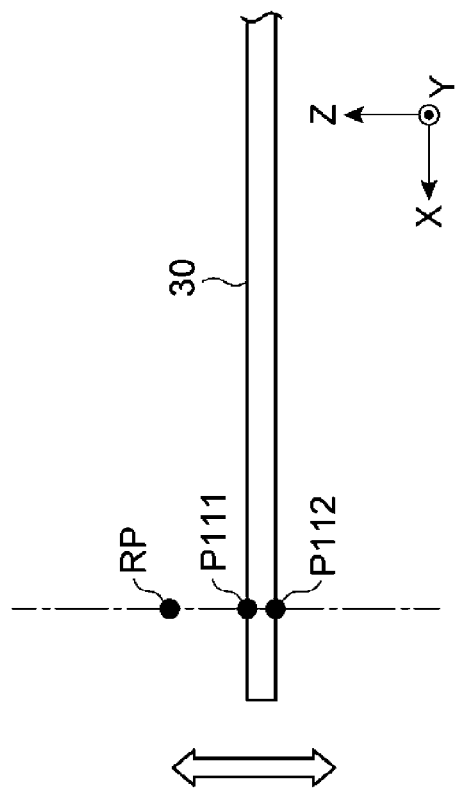
FIGS. 24A and 24B are schematic views illustrating movements of the hand in the first height scanning control and the second height scanning control.

In step S137, the height scanning controller 141 moves (down) the hand 30 by the arm 40 in the negative direction of the Z axis until the hand 30 reaches the start position of the movement in step S132. As a result, the Z coordinate of the position of the hand 30 is acquired at a timing when a point P111 of the upper portion of the hand 30 and a point P112 of the lower portion of the hand 30 within the same plane perpendicular to the X axis reach the height of the reference position RP (see, e.g., FIG. 24A).

Figure 23:
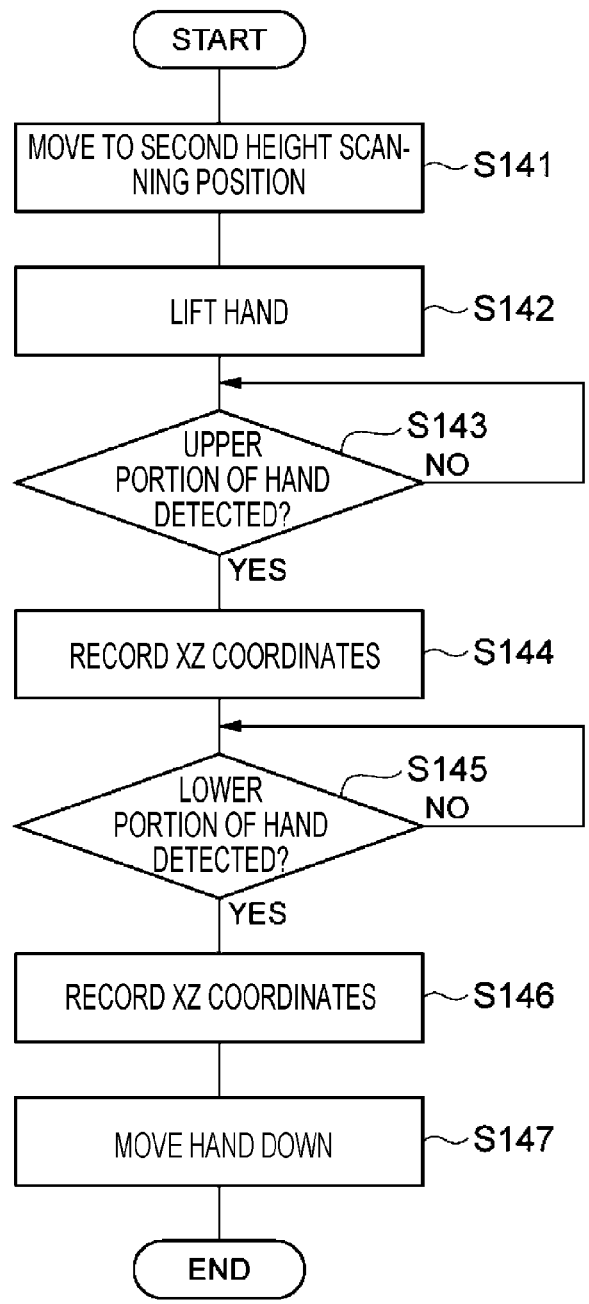
FIG. 23 is a flowchart illustrating a procedure of a second height scanning control.

FIG. 23 is a flowchart illustrating the specific contents of step S122. As illustrated in FIG. 23, the controller 100 first performs steps S141 and S142. In step S141, the height scanning controller 141 controls the arm 40 to place the hand 30 at the second height scanning position below the reference position RP, and to make the tip end of the hand 30 face the positive direction of the X axis. In step S142, the height scanning controller 141 controls the arm 40 to start the movement (lifting) of the hand 30 in the positive direction of the Z axis (e.g., a height scanning direction which is orthogonal to the scanning direction (e.g., X-axis direction)). As described herein and above, the first height scanning position and the second height scanning position are different from each other in a direction that intersects the height scanning direction.

Next, the controller 100 performs steps S143 and S144. In step S143, the height detector 142 waits for the detection of the upper portion of the hand 30 by the horizontal sensor 13 of the processing station 10. In step S144, the height detector 142 acquires the Z coordinate (Z coordinate in the robot coordinate system) of the position of the hand 30 at the timing when the upper portion of the hand 30 reaches the height of the reference position RP (hereinafter, referred to as the "reaching position of the upper portion in the second height scanning control"), from the height scanning controller 141.

Figure 24B:
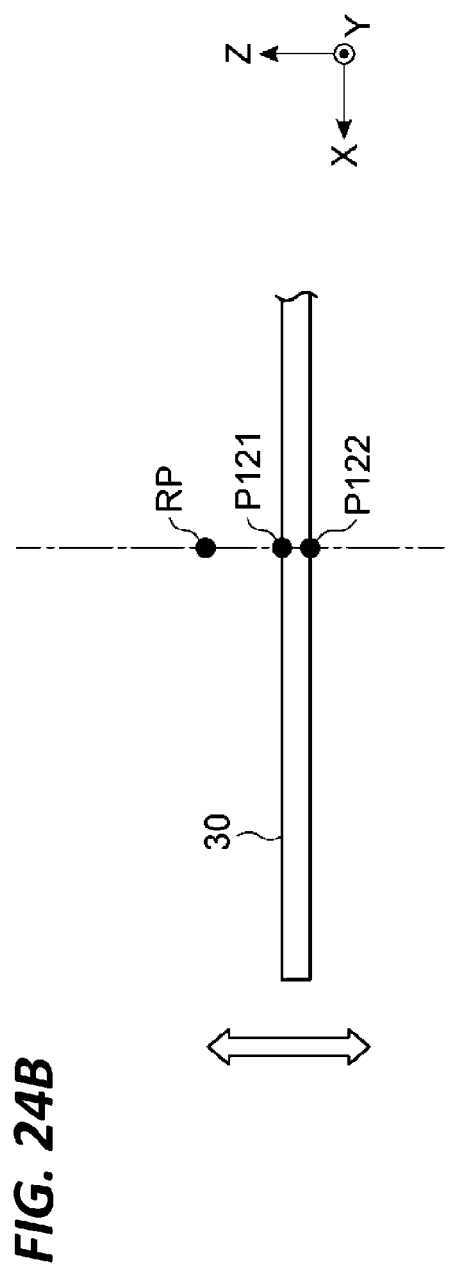

Next, the controller 100 performs steps S145, S146, and S147. In step S145, the height detector 142 waits for the detection of the lower portion of the hand 30 by the horizontal sensor 13 of the processing station 10. In step S146, the height detector 142 acquires the Z coordinate (Z coordinate in the robot coordinate system) of the position of the hand 30 at the timing when the lower portion of the hand 30 reaches the height of the reference position RP (hereinafter, referred to as the "reaching position of the lower portion in the second height scanning control"), from the height scanning controller 141. In step S147, the height scanning controller 141 moves (down) the hand 30 by the arm 40 in the negative direction of the Z axis until the hand 30 reaches the start position of the movement in step S142. As a result, the Z coordinate of the position of the hand 30 is acquired at the timing when a point P121 of the upper portion of the hand 30 and a point P122 of the lower portion of the hand 30 within the same plane perpendicular to the X axis reach the height of the reference position RP at positions different from the points P111 and P112 (see, e.g., FIG. 24B).

Figure 25:
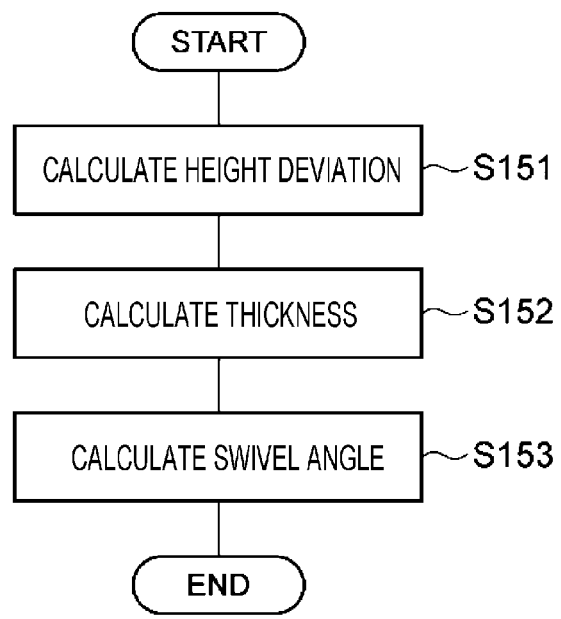
FIG. 25 is a flowchart illustrating a procedure for calculating the height deviation of the hand.

FIG. 25 is a flowchart illustrating the specific contents of step S123. As illustrated in FIG. 25, the controller 100 performs steps S151, S152, and S153. In step S151, the height detector 142 calculates a difference between the Z coordinate of the position of the hand 30 at the timing when the upper portion of the hand 30 reaches the height of the reference position RP (hereinafter, referred to as the "reaching position") and the Z coordinate of the position of the hand 30 at a scheduled timing when the upper portion of the hand 30 reaches the height of the reference position RP. The height detector 142 may calculate an average value of the Z coordinate of the reaching position of the hand 30 in the first height scanning control and the Z coordinate of the reaching position of the hand 30 in the second height scanning control. For example, the height detector 142 calculates the Z coordinate of the reaching position by the following equation.

$$Zr=(Z11+Z21)/2 \quad (21)$$

Zr: Z coordinate of the reaching position
Z11: Z coordinate of the reaching position of the upper portion in the first height scanning control
Z21: Z coordinate of the reaching position of the upper portion in the second height scanning control In step S152, the height detector 142 detects the thickness of the hand 30 based on the timing at which the upper portion of the hand 30 reaches the height of the reference position RP and the timing at which the lower portion of the hand 30 reaches the height of the reference position RP. For example, the height detector 142 calculates, as the thickness of the hand 30, the lifting stroke of the hand 30 from the timing at which the upper portion of the hand 30 reaches the height of the reference position RP to the timing at which the lower portion of the hand 30 reaches the height of the reference position RP. The height detector 142 may calculate an average value of the thickness of the hand 30 in the first height scanning control and the thickness of the hand 30 in the second height scanning control. For example, the height detector 142 calculates the thickness of the hand 30 by the following equations.

$$T1=Z12-Z11 \quad (22)$$

$$T2=Z22-Z21 \quad (23)$$

$$T=(T1+T2)/2 \quad (24)$$

Z12: Z coordinate of the reaching position of the lower portion in the first height scanning control
Z22: Z coordinate of the reaching position of the lower portion in the second height scanning control In step S153, the height detector 142 detects the inclination of the hand 30, based on the timing at which the upper portion of the hand 30 reaches the reference position RP in the first height scanning control and the timing at which the upper portion of the hand 30 reaches the reference position RP in the second height scanning control. For example, the height detector 142 calculates the inclination of the hand 30, based on the X and Z coordinates of the position of the hand 30 at the timing when the upper portion of the hand 30 reaches the height of the reference position RP in the first height scanning control and the X and Z coordinates of the position of the hand 30 at the timing when the upper portion of the hand 30 reaches the height of the reference position RP in the second height scanning control. For example, the height detector 142 calculates the inclination of the hand 30 by the following equation.

$$\theta h2=\tan^{-1}((Z11-Z21)/(Xh2-Xh1)) \quad (25)$$

θh2: Inclination angle of the hand 30 around the axis parallel to the Y axis
Xh1: X coordinate of the first height scanning position Xh2: X coordinate of the second height scanning position

[Effect of Embodiments]

As described above, the transfer system 2 includes the hand 30 that supports the workpiece W to be transferred; the arm 40 that moves the hand 30; the scanning controller 113 that moves the hand 30 by the arm 40 along the scanning direction that intersects the sides 33a and 33b which are fixed to the hand 30 and are not parallel with each other, such that the sides 33a and 33b pass the known reference position RP in the transfer path of the workpiece W; and the position detector 114 that detects the positional deviation of the hand 30 in the direction intersecting the scanning direction, based on the timing at which the side 33a reaches the reference position RP and the timing at which the side 33b reaches the reference position RP, while the scanning controller 113 is moving the hand 30.

The positional deviation of the hand 30 in the direction intersecting the scanning direction may be detected by the configuration for detecting the reaching of the indicator (sides 33a and 33b) to the reference position RP. Thus, the transfer system 2 of the present disclosure is effective in performing the calibration of the position of the hand 30 using the relatively simple configuration with relatively higher accuracy.

The position detector 114 may further detect the positional deviation of the hand 30 in the scanning direction, based on the timing at which the side 33a reaches the reference position RP while the scanning controller 113 is moving the hand 30. In this case, both the position of the hand 30 in the scanning direction and the position of the hand 30 in the direction intersecting the scanning direction may be detected by the configuration for detecting the reaching of the indicator (e.g., sides 33a and 33b) to the reference position RP. Thus, it is possible to perform the calibration of the position of the hand 30 using the relatively simple configuration with relatively higher accuracy.

The scanning controller 113 may move the hand 30 along the scanning direction at each of the first scanning position and the second scanning position which are different from each other in the direction intersecting the scanning direction, and the position detector 114 may further detect the inclination of the hand 30 based on the timing at which the side 33a reaches the reference position RP while the scanning controller 113 is moving the hand 30 at the first scanning position and the timing at which the side 33a reaches the reference position RP while the scanning controller 113 is moving the hand 30 at the second scanning position. In this case, the inclination of the hand 30 may also be detected by the configuration for detecting the reaching of the indicator (e.g., sides 33a and 33b) to the reference position RP. Thus, it is possible to perform the calibration of the position of the hand 30 using the relatively simple configuration with relatively higher accuracy.

The position detector 114 may correct the detection result of the positional deviation of the hand 30 based on the detection result of the inclination of the hand 30. In this case, it is possible to perform the calibration of the position of the hand 30 using the relatively simple configuration with relatively higher accuracy.

The transfer system 2 may further include the arm inclination detector 121 that causes the scanning controller 113 to move the hand 30 using each of the first position RP1 and the second position RP2 which are different from each other as the reference position RP, and detects the inclination of the base mount 41 of the arm 40 based on the timing at which the side 33a reaches the first position RP1 while the scanning controller 113 is moving the hand 30 using the first position RP1 as the reference position RP and the timing at which the side 33a reaches the second position RP2 while the scanning controller 113 is moving the hand 30 using the second position RP2 as the reference position RP. In this case, the inclination of the base mount 41 of the arm 40 may also be detected by the configuration for detecting the reaching of the indicator to the first position RP1 and the configuration for detecting the reaching of the indicator to the second position RP2. Thus, it is possible to perform the calibration of the position of the hand 30 using the relatively simple configuration with relatively higher accuracy.

The transfer system 2 may further include the pivoting command correction unit 122 that corrects the control command of the arm 40 to reduce the positional deviation of the hand 30 caused from the inclination of the base mount 41 that has been detected by the arm inclination detector 121, the scanning controller 113 may move the hand 30 by the arm 40 along the scanning direction such that the sides 33a and 33b pass the reference position RP again, based on the control command corrected by the pivoting command correction unit 122, and the position detector 114 may detect the positional deviation of the hand 30 again based on the timing at which the side 33a reaches the reference position RP again and the timing at which the side 33b reaches the reference position RP again. In this case, the control command is corrected to reduce the positional deviation of the hand 30 caused from the inclination of the base mount 41 of the arm 40, and the position of the hand 30 is detected again according to the corrected control command. Thus, it is possible to perform the calibration of the position of the hand 30 using the relatively simple configuration with relatively higher accuracy.

The transfer system 2 may further include the intersecting scanning controller 131 that moves the hand 30 by the arm 40 along the intersecting scanning direction that intersects the scanning direction, such that either the side 33a or the side 33b, and the side 33c which is fixed to the hand 30 and is not parallel to any of the sides 33a and 33b pass the reference position RP, and the position detector 114 may further detect the positional deviation of the hand 30 in the direction intersecting the intersecting scanning direction based on the timing at which at least one of the sides 33a and 33b reaches the reference position RP and the timing at which the side 33c reaches the reference position RP, while the intersecting scanning controller 131 is moving the hand 30. In this case, since the information obtained from the configuration for detecting the reaching of the indicator to the reference position RP increases, it is possible to perform the calibration of the position of the hand 30 using the relatively simple configuration with relatively higher accuracy.

The position detector 114 may further detect the positional deviation of the hand 30 in the intersecting scanning direction based on the timing at which the side 33c reaches the reference position RP. In this case, since the information obtained from the configuration for detecting the reaching of the indicator to the reference position RP further increases, it is possible to perform the calibration of the position of the hand 30 using the relatively simple configuration with relatively higher accuracy.

According to the present disclosure, it is possible to provide a transfer system which is effective in performing the calibration of the position of the hand that supports the substrate using the relatively simple configuration with relatively higher accuracy.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A transfer system comprising:
a hand configured to support a substrate to be transferred;
an arm configured to move the hand;
a scanning controller configured to move the hand by the arm along a scanning direction that intersects a first line and a second line which are provided to be fixed to the hand and not parallel with each other, such that the first line and the second line pass a known reference position in a transfer path of the substrate; and
a position detector configured to detect a positional deviation of the hand in a direction intersecting the scanning direction, based on a first timing at which the first line reaches the reference position and a second timing at which the second line reaches the reference position, while the scanning controller is moving the hand by the arm along the scanning direction.

2. The transfer system according to claim 1, wherein the position detector is configured to further detect the positional deviation of the hand in the scanning direction, based on the first timing at which the first line reaches the reference position while the scanning controller is moving the hand by the arm along the scanning direction.

3. The transfer system according to claim 1, wherein the scanning controller moves the hand along the scanning direction at each of a first scanning position and a second scanning position which are different from each other in the direction intersecting the scanning direction, and
the position detector further detects an inclination of the hand, based on a third timing at which the first line reaches the reference position while the scanning controller is moving the hand at the first scanning position and a fourth timing at which the first line reaches the reference position while the scanning controller is moving the hand at the second scanning position.

4. The transfer system according to claim 3, wherein the position detector corrects a detection result of the positional deviation of the hand based on a detection result of the inclination of the hand.

5. The transfer system according to claim 1, further comprising:
an arm inclination detector configured to cause the scanning controller to move the hand using each of a first position and a second position which are different from each other as the reference position, and detect an inclination of a base of the arm based on a fifth timing at which the first line reaches the first position while the scanning controller is moving the hand using the first position as the reference position and a sixth timing at which the first line reaches the second position while the scanning controller is moving the hand using the second position as the reference position.

6. The transfer system according to claim 5, further comprising:
a command corrector configured to correct a control command of the arm to reduce the positional deviation of the hand caused from the inclination of the base detected by the arm inclination detector,
wherein the scanning controller moves the hand by the arm along the scanning direction such that the first line and the second line pass the reference position again, based on the control command corrected by the command corrector, and
the position detector detects the positional deviation of the hand again, based on a seventh timing at which the first line reaches the reference position again and an eighth timing at which the second line reaches the reference position again.

7. The transfer system according to claim 1, further comprising:
an intersecting scanning controller configured to move the hand by the arm along an intersecting scanning direction that intersects the scanning direction, such that either the first line or the second line, and a third line which is provided to be fixed to the hand and not parallel with any of the first line or the second line pass the reference position,
wherein the position detector further detects the positional deviation of the hand in a direction intersecting the intersecting scanning direction, based on a ninth timing at which at least one of the first line and the second line reaches the reference position and a tenth timing at which the third line reaches the reference position, while the intersecting scanning controller is moving the hand by the arm along the intersecting scanning direction.

8. The transfer system according to claim 7, wherein the position detector further detects the positional deviation of the hand in the intersecting scanning direction based on the tenth timing at which the third line reaches the reference position.

9. The transfer system according to claim 1, further comprising:
a height scanning controller configured to lift the hand by the arm along a height scanning direction that is orthogonal to the scanning direction such that the hand passes the reference position; and
a height detector configured to detect a height deviation of the hand in the height scanning direction, based on an eleventh timing at which the hand reaches the reference position while the height scanning controller is lifting the hand by the arm along the height scanning direction.

10. The transfer system according to claim 9, wherein the height scanning controller lifts the hand at each of a first height scanning position and a second height scanning position different from each other in a direction that intersects the height scanning direction, and
the height detector further detects an inclination of the hand, based on a twelfth timing at which the hand reaches the reference position while the height scanning controller is lifting the hand along the height scanning direction at the first height scanning position, and a thirteenth timing at which the hand reaches the reference position while the height scanning controller is lifting the hand along the height scanning direction at the second height scanning position.

11. The transfer system according to claim 9, further comprising:
a lifting command correction unit configured to correct a target height of the hand to reduce the height deviation of the hand detected by the height detector.

12. The transfer system according to claim 7, wherein the intersecting scanning controller moves the hand along the intersecting scanning direction at each of a third scanning position and a fourth scanning position which are different from each other in a direction orthogonal to the intersecting scanning direction, and the position detector further detects an inclination of the hand, based on a fourteenth timing at which the third line reaches the reference position while the intersecting scanning controller is moving the hand along the intersecting scanning direction at the third scanning position, and a fifteenth timing at which the third line reaches the reference position while the intersecting scanning controller is moving the hand along the intersecting scanning direction at the fourth scanning position.

13. A transfer control method comprising:
providing a first line and a second line to be fixed on a hand of a transfer system supporting a substrate to be transferred, the first line and the second line being not parallel with each other;
moving the hand by an arm along a scanning direction that intersects the first line and the second line such that the first line and the second line pass a known reference position in a transfer path of the substrate; and
detecting a positional deviation of the hand in a direction intersecting the scanning direction, based on a first timing at which the first line reaches the reference position and a second timing at which the second line reaches the reference position, while the hand is being moved along the scanning direction.

14. The transfer control method according to claim 13, wherein the detecting the positional deviation of the hand further detects a positional deviation of the hand in the scanning direction, based on the first timing at which the first line reaches the reference position while the hand is being moved along the scanning direction in the moving.

15. The transfer control method according to claim 13, wherein the moving the hand moves the hand along the scanning direction at each of a first scanning position and a second scanning position which are different from each other in the direction intersecting the scanning direction, and the detecting the positional deviation of the hand further detects an inclination of the hand, based on a third timing at which the first line reaches the reference position while the hand is being moved at the first scanning position, and a fourth timing at which the first line reaches the reference position while the hand is being moved at the second scanning position.

16. The transfer control method according to claim 15, wherein the detecting the positional deviation of the hand corrects a detection result of the positional deviation of the hand based on a detection result of the inclination of the hand.

17. The transfer control method according to claim 13, further comprising:
causing the moving the hand to move the hand using each of a first position and a second position which are different from each other as the reference position, and
detecting an inclination of a base of the arm based on a fifth timing at which the first line reaches the first position while the hand is being moved using the first position as the reference position and a sixth timing at which the first line reaches the second position while the hand is being moved using the second position as the reference position.

18. The transfer control method according to claim 17, further comprising:
correcting a control command of the arm to reduce the positional deviation of the hand caused from the inclination of the base detected by the detecting the inclination of the base of the arm,
wherein the moving the hand moves the hand by the arm along the scanning direction such that the first line and the second line pass the reference position again, based on the control command corrected by the command correction process, and
the detecting the positional deviation of the hand detects the positional deviation of the hand again, based on a seventh timing at which the first line reaches the reference position again and an eighth timing at which the second line reaches the reference position again.

19. The transfer control method according to claim 13, further comprising:
moving the hand by the arm along an intersecting scanning direction that intersects the scanning direction, such that either the first line or the second line, and a third line which is provided to be fixed to the hand and not parallel with any of the first line or the second line pass the reference position,
wherein the detecting the positional deviation of the hand further detects the positional deviation of the hand in a direction intersecting the intersecting scanning direction, based on a ninth timing at which at least one of the first line and the second line reaches the reference position and a tenth timing at which the third line reaches the reference position, while the hand is being moved along the intersecting scanning direction.

20. The transfer control method according to claim 19, wherein the detecting the positional deviation of the hand further detects the positional deviation of the hand in the intersecting scanning direction based on the tenth timing at which the third line reaches the reference position.

21. The transfer control method according to claim 13, further comprising:
lifting the hand by the arm along a height scanning direction that is orthogonal to the scanning direction such that the hand passes the reference position; and
detecting a height deviation of the hand in the height scanning direction, based on an eleventh timing at which the hand reaches the reference position while the hand is being lifted along the height scanning direction.

22. The transfer control method according to claim 21, wherein the lifting the hand lifts the hand at each of a first height scanning position and a second height scanning position different from each other in a direction that intersects the height scanning direction, and the detecting the height deviation of the hand further detects an inclination of the hand, based on a twelfth timing at which the hand reaches the reference position while the hand is being lifted along the height scanning direction at the first height scanning position, and a thirteenth timing at which the hand reaches the reference position while the hand is being lifted along the height scanning direction at the second height scanning position.

23. The transfer control method according to claim 21, further comprising:
correcting a target height of the hand to reduce the height deviation of the hand detected by the detecting the height deviation of the hand.

24. The transfer control method according to claim 19, wherein the moving the hand by the arm moves the hand along the intersecting scanning direction at each of a third scanning position and a fourth scanning position which are different from each other in a direction orthogonal to the intersecting scanning direction, and the detecting the positional deviation of the hand further detects an inclination of the hand, based on a fourteenth timing at which the third line reaches the reference position while the hand is being moved along the intersecting scanning direction at the third scanning position, and a fifteenth timing at which the third line reaches the reference position while the hand is being moved along the intersecting scanning direction at the fourth scanning position.

25. A substrate processing system comprising:
a plurality of processing stations configured to perform a predetermined processing on a substrate; and
the transfer system of claim 1 configured to carry in/out the substrate with respect to each of the plurality of processing stations.

26. A transfer system control device for controlling a transfer system provided with a hand that supports a substrate to be transferred and an arm that moves the hand, the transfer system control device comprising:
a scanning controller configured to move the hand by the arm along a scanning direction that intersects a first line and a second line which are provided to be fixed to the hand and not parallel with each other, such that the first line and the second line pass a known reference position in a transfer path of the substrate; and
a position detector configured to detect a positional deviation of the hand in a direction intersecting the scanning direction, based on a first timing at which the first line reaches the reference position and a second timing at which the second line reaches the reference position, while the scanning controller is moving the hand by the arm along the scanning direction.

27. A transfer system control device for controlling a transfer system provided with a hand that supports a substrate to be transferred and an arm that moves the hand, the transfer system control device comprising:
a memory; and
control circuitry coupled to the memory and configured to:
move the hand by the arm along a scanning direction that intersects a first line and a second line which are provided to be fixed to the hand and not parallel with each other, such that the first line and the second line pass a known reference position in a transfer path of the substrate; and
detect a positional deviation of the hand in a direction intersecting the scanning direction, based on a first timing at which the first line reaches the reference position and a second timing at which the second line reaches the reference position, while the hand is being moved by the arm along the scanning direction.

* * * * *